United States Patent [19]
Wiedeman et al.

[11] Patent Number: 6,072,768
[45] Date of Patent: Jun. 6, 2000

[54] AUTOMATIC SATELLITE/TERRESTRIAL MOBILE TERMINAL ROAMING SYSTEM AND METHOD

[75] Inventors: Robert Wiedeman, Los Altos; Michael J. Sites, Fremont, both of Calif.

[73] Assignee: Globalstar L.P., San Jose, Calif.

[21] Appl. No.: 08/707,534

[22] Filed: Sep. 4, 1996

[51] Int. Cl.[7] ................................................. H04B 11/00
[52] U.S. Cl. .................. 370/58; 340/825.44; 370/316; 370/320; 375/200; 455/13.1; 455/405; 455/12.1
[58] Field of Search ...................... 340/825.44; 370/316, 370/320; 375/200; 455/13.1, 405, 12.1

[56] References Cited

U.S. PATENT DOCUMENTS

| Re. 32,905 | 4/1989 | Baran ...................................... 370/104 |
|---|---|---|
| 4,901,307 | 2/1990 | Gilhousen et al. ....................... 370/18 |
| 5,010,317 | 4/1991 | Schwendeman et al. ............ 340/311.1 |
| 5,073,900 | 12/1991 | Mallinckrodt ............................... 375/1 |
| 5,081,703 | 1/1992 | Lee .......................................... 455/13 |

(List continued on next page.)

FOREIGN PATENT DOCUMENTS

| 0 421 698 A3 | 10/1991 | European Pat. Off. . |
|---|---|---|
| 0 506 255 A2 | 9/1992 | European Pat. Off. . |
| WO 90/13186 | 11/1990 | WIPO . |
| WO 91/09473 | 6/1991 | WIPO . |
| WO 93/09613 | 5/1993 | WIPO . |
| WO 96/12377 | 4/1996 | WIPO . |
| WO 96/34503 | 10/1996 | WIPO . |

OTHER PUBLICATIONS

Petition of American Mobile Satellite Corporation Before the FCC, Washington, DC 20554, dated Jun. 3, 1991, pp. 1–15.

Application of Motorola Satellite Communications, Inc. for IRIDIUM A Low Earth Orbit Mobile Satellite System before the FCC, Washington, D.C. Dec. 1990, pp. 49–96.

Before the FCC, Washington, D.C. 20554 ARIES CONSTELLATION Low Earth Orbit Satellite System Proposal of Constellation Communications, Inc. Jun. 3, 1991, Appendix A, B, and C.

Application of TRW Inc. for Authority to Construct a New Communications Satellite SYSTEM ODYSSEY before the FCC, Washington, D.C. 20554, May 31, 1991, pp. 33–51.

Application of Ellipsat Corporation ELLIPSAT for the Authority to Construct ELLIPSO I An Elliptical Orbit Satellite System, before the FCC, Washington, D.C. 20554, Nov. 2, 1990, pp. 5–34.

Application of Loral Cellular Systems, Corp., Globalstar Mobile COmmunications Wherever You Are, before the FCC, Washington, D.C. Jun. 3, 1991, pp. 94–187.

"An Integrated Satellite–Cellular Land Mobile System for Europe", E. Del Re, University of Florence, Dept. of Electronics Engineering, italy, Sep. 21, 1989.

(List continued on next page.)

*Primary Examiner*—William Cumming
*Attorney, Agent, or Firm*—Ohlandt, Greeley, Ruggiero & Perle, L.L.P.

[57] ABSTRACT

A communications system includes a satellite communications component having at least one satellite and at least one terrestrial gateway, and also a wireless terrestrial communications component having at least one repeater and at least one mobile switching center. The at least one gateway and the at least one mobile switching center are coupled together by a first mobile applications part (MAP) network, such as an IS-41 or GSM MAP network. The at least one gateway and the at least one mobile switching center are further coupled to a terrestrial communications network (PSTN). The system further includes at least one dual mode or higher user terminal having a first transceiver for bidirectionally communicating with the gateway through the satellite, a second transceiver for bidirectionally communicating with the mobile switching center through the repeater, and a controller, responsive to one of a user selected or a gateway selected protocol, for selectively enabling either the first or the second transceiver for conveying a user communication to the terrestrial communications network.

14 Claims, 30 Drawing Sheets

U.S. PATENT DOCUMENTS

| | | |
|---|---|---|
| 5,109,390 | 4/1992 | Gilhousen et al. .......................... 375/1 |
| 5,119,225 | 6/1992 | Grant et al. .............................. 359/172 |
| 5,216,427 | 6/1993 | Yan et al. ................................ 342/352 |
| 5,233,626 | 8/1993 | Ames ......................................... 375/1 |
| 5,239,671 | 8/1993 | Linquist et al. ........................ 455/13.1 |
| 5,265,119 | 11/1993 | Gilhousen et al. .......................... 375/1 |
| 5,303,286 | 4/1994 | Wiedeman ................................ 379/59 |
| 5,339,330 | 8/1994 | Mallinckrodt ............................... 375/1 |
| 5,390,362 | 2/1995 | Modjeska et al. ................. 340/825.44 |
| 5,410,728 | 4/1995 | Bertiger et al. ......................... 455/13.1 |
| 5,415,368 | 5/1995 | Horstein et al. ..................... 244/158 R |
| 5,422,647 | 6/1995 | Hirshfield et al. ...................... 342/354 |
| 5,433,726 | 7/1995 | Horstein et al. ..................... 244/158 R |
| 5,439,190 | 8/1995 | Horstein et al. ......................... 244/158 |
| 5,446,756 | 8/1995 | Mallinckrodt ........................... 375/200 |
| 5,448,623 | 9/1995 | Wiedeman et al. ...................... 379/59 |
| 5,511,233 | 4/1996 | Otten ..................................... 455/56.1 |
| 5,526,404 | 6/1996 | Wiedeman et al. . |
| 5,535,430 | 7/1996 | Aoki et al. .............................. 455/54.1 |
| 5,551,624 | 9/1996 | Horstein et al. ..................... 244/158 R |
| 5,586,165 | 12/1996 | Wiedeman . |
| 5,592,481 | 1/1997 | Wiedeman et al. ..................... 370/316 |
| 5,594,780 | 1/1997 | Wiedeman et al. . |
| 5,619,525 | 4/1997 | Wiedeman et al. ..................... 375/200 |
| 5,634,190 | 5/1997 | Wiedeman ............................ 455/13.1 |
| 5,640,386 | 6/1997 | Wiedeman ............................. 370/320 |
| 5,655,005 | 8/1997 | Wiedeman et al. ..................... 370/320 |
| 5,664,006 | 9/1997 | Monte et al. ........................... 455/405 |
| 5,697,050 | 12/1997 | Wiedeman ............................ 455/12.1 |
| 5,715,297 | 2/1998 | Wiedeman . |

OTHER PUBLICATIONS

Current and Future Mobile Satellite Communication Systems, S. Kato et al., IEICE Transactions, vol. E 74, No. 8, Aug. 1991, pp. 2201–2210.

"Digital Network Oriented Mobile Radio Satellite System as an Integrated Part of the GSM Cellular Radio System in Europe", P. Dondl, Deutsch BUndespost/Fernmeldetechniches Zentralmt/Darmstadt, Fed. Rep. Germ. Sep. 21, 1989.

"The OmniTRACS$^R$ Mobile Satellite Communications and Positioning System", E. Tiedemann, Jr. et al., Vehicle Electronics in the 90's: Proceedings of the In'l. Congress on Transportation Electronics, Oct. 1990.

"Software Implementation of a PN Spread Spectrum Receiver to Accommodate Dynamics", C. Cahn et al., IEEE Trans, on Comm., vol. COM–25, No. 8, Aug. 1977.

"A Communication Technique for Multipath Channels", R. Price, Proceedings of the IR, Mar. 1958, pp 555–570.

"Increased Capacity Using CDMA for Mobile Satellite Communication", K. Gilhousen et al., IEEE Journal on Selected Areas in Communications, vol. 8, No. 4, May 1990, pp. 503–514.

"The Iridium$^{TM1}$ System—A Revolutionary Satellite Communications System Developed with Innovative Applications of Technology", D. Sterling et al., IEEE, MILCOM 1991, Nov. 4–7.

"Iridium: Key to Worldwide Cellular Communications", J. Foley, Telecommunications, Oct. 1991, pp. 23–28.

"Architecture of on Integrated GSM–Satellite System", Francesco Delli Priscoli, European Transactions on Telecommunications and Related Technologies, vol. 5, No. 5, Sep./Oct. 1994, 5 pages.

TYPE 1

TYPE 2

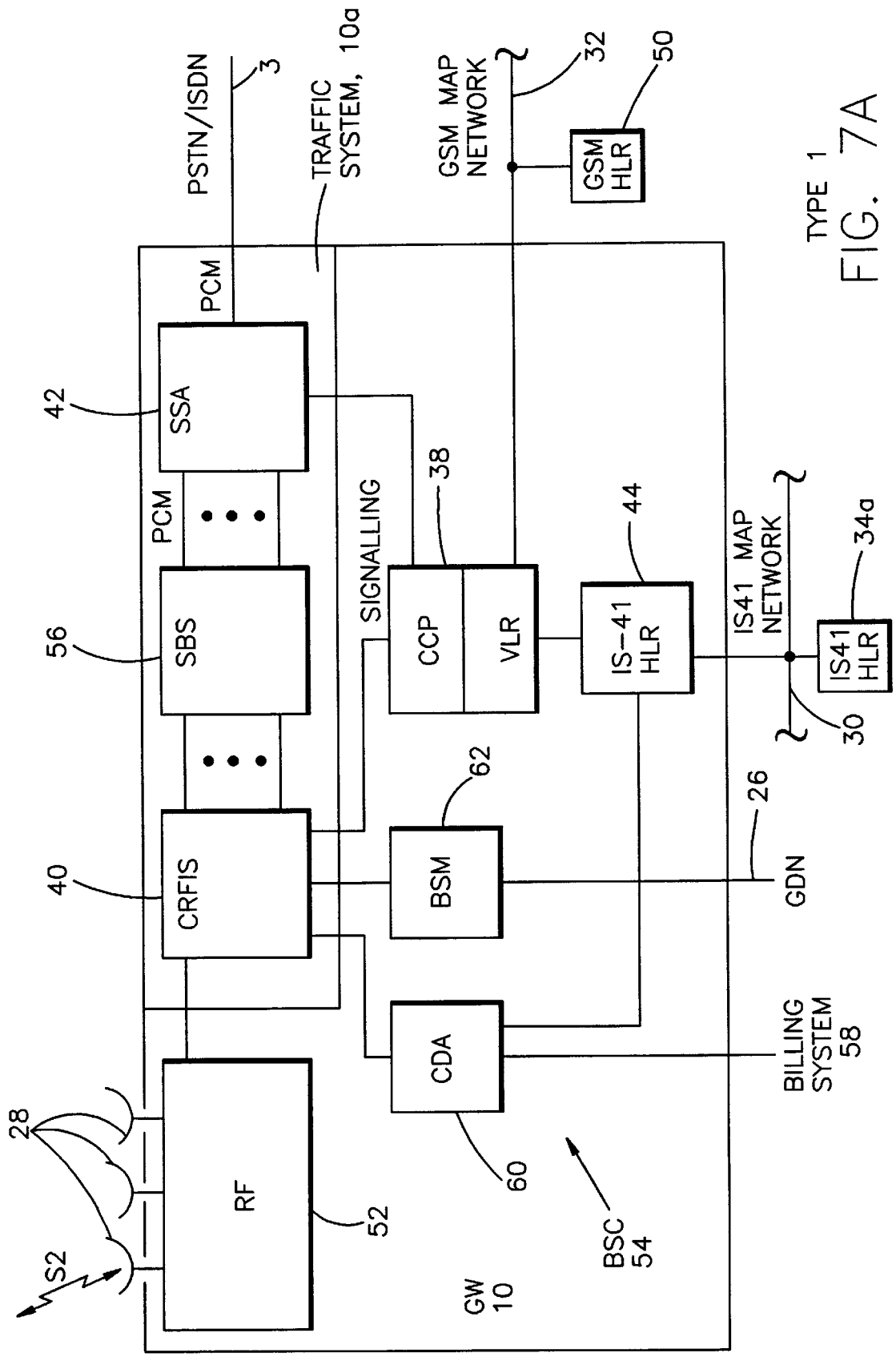
FIG. 7A  TYPE 1

TYPE 1

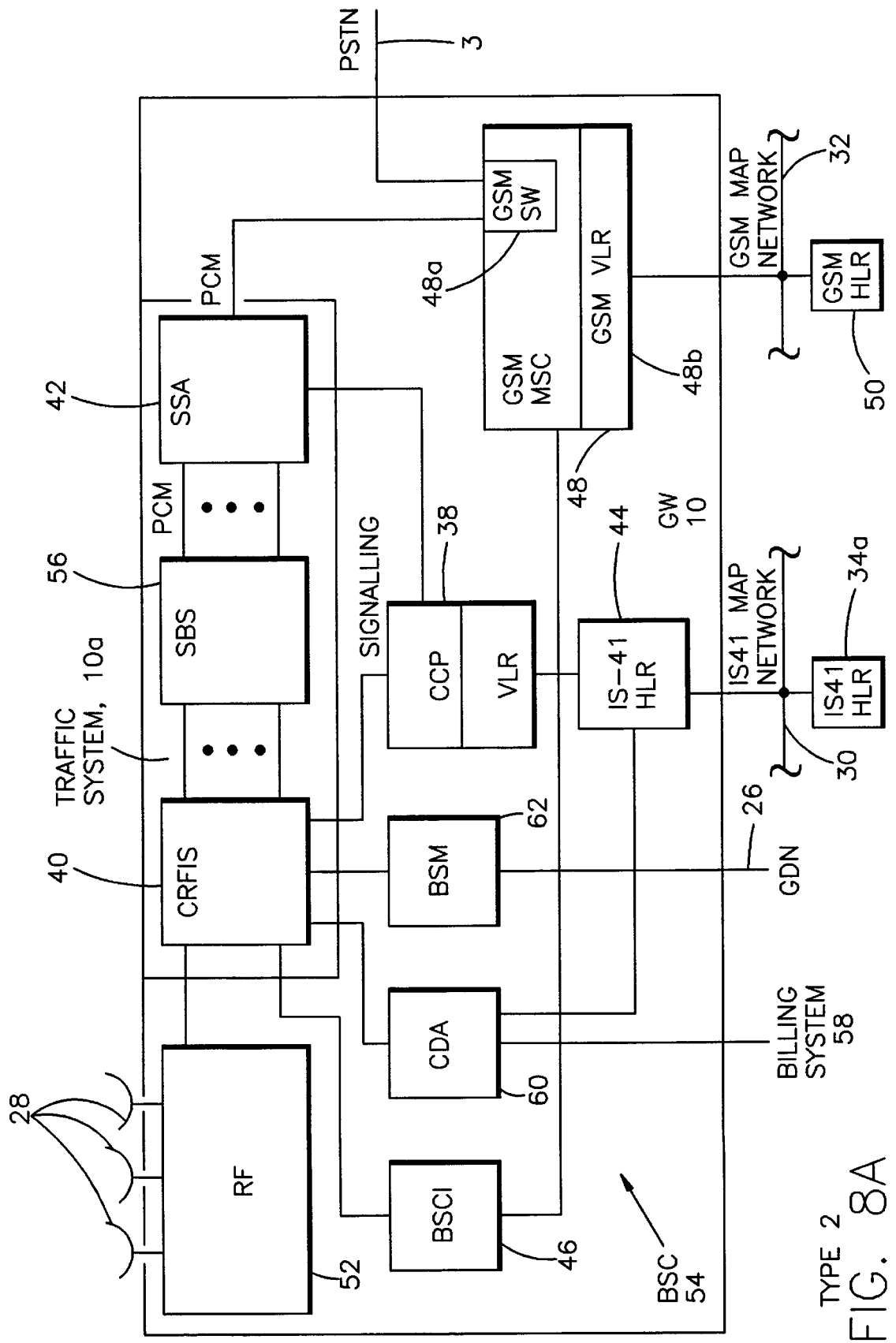
FIG. 8A TYPE 2

TYPE 2

AUTOMATIC SATELLITE/TERRESTRIAL MOBILE TERMINAL ROAMING SYSTEM AND METHOD

FIELD OF THE INVENTION

This invention relates generally to mobile communications systems and, in particular, to terrestrial cellular and mobile satellite communications systems.

BACKGROUND OF THE INVENTION

Mobile satellite communications systems are being employed worldwide. In general, previous systems have been regional in nature. However, global systems are being proposed and introduced. These global systems offer the potential for international roaming and, as a result, a need will exist for user terminals which can allow worldwide roaming. That is, a need will exist for a user terminal that can be used to make and receive calls without regard for geographic, economic, or political boundaries.

Single mode satellite user terminals (i.e., satellite only) can allow worldwide access. However, with the wide spread deployment of cellular, Personal Communications Systems (PCS) and other terrestrial mobile systems there will be a logical need to inter-work with such systems. For example, in such systems, and for dual mode terminals (e.g., analog/digital), it is often the case the digital mode is preferred, and is automatically selected where available.

Such inter-working is cost effective and may increase user quality of service in urban and suburban environments, while the satellite service can be used in rural areas and areas where terrestrial mobile service is not available or economical.

In order to accomplish such inter-working a dual mode user terminal may be required. That is, a user terminal capable of operating in either the satellite or the terrestrial cellular environment.

It is envisaged that mobile users will be roaming in both of these environments. The terrestrial environment is generally limited to those service areas which have land-based repeaters (towers, etc.) or other local area repeaters (e.g., balloons or aircraft). Necessarily, these mobile service areas are rather small, and are generally located in cities, towns and along heavily traveled roads. The satellite system, on the other hand, provides ubiquitous coverage and includes both the terrestrial mobile service areas and non-terrestrial service areas.

Terrestrial mobile systems do not have perfect coverage, especially at the fringe of cell areas, and furthermore many have "holes" or "gaps" within their service areas due to terrain blocking or other reasons. Users of terrestrial mobile systems can experience dropped calls and service when located within these fringe areas and holes. Satellite systems can fill these holes and fringe areas if the user terminals can inter-work sufficiently to assure proper technical connection and switch-over from one system to another.

At present, there are no currently existing or proposed terrestrial/satellite communications systems known to the inventors that adequately address these important needs.

It is noted that in an article entitled "An Integrated Satellite-Cellular Land Mobile System for Europe" (1989), E. Del Re describes a proposal for integrating a satellite communication system with the European GSM terrestrial cellular system. In the Del Re approach is it desirable to maintain common protocols (layers 2 and 3) between the satellite and GSM systems, with the majority of the differences being in the layer 1 (e.g., RF bands and synchronization procedures).

In U.S. Pat. No. 5,073,900, entitled "Integrated Cellular Communication System", A. Mallinckrodt describes a cellular communications system having fully integrated surface and satellite nodes. That is, space node satellite cells can overlap ground cells. A system network control center is used to designate handling for a particular call to one of a satellite node or a regional node control center. Mallinckrodt mentions that in one embodiment the user can select whether to use the satellite link or the ground-based link.

Neither Del Re or Mallinckrodt is seen to provide a satisfactory solution to the problem of providing full inter-working between a satellite communication system and one or more existing terrestrial communication systems.

OBJECTS OF THE INVENTION

It is a first object of this invention to provide methods and apparatus for enabling an inter-working between one or more terrestrial mobile systems and a mobile satellite system.

It is a second object of this invention to provide methods and apparatus for providing automatic call management between one or more terrestrial mobile systems and a mobile satellite system.

It is a further object of this invention to provide a multiple mode user terminal having an ability to select or have selected for it a preferred initial condition, and to provide methods and apparatus for enabling automatic switching between these conditions.

SUMMARY OF THE INVENTION

The foregoing and other problems are overcome and the objects of the invention are realized by methods and apparatus in accordance with embodiments of this invention.

In one aspect this invention teaches a communications system having a satellite communications component comprising at least one satellite and at least one terrestrial gateway, and also a wireless terrestrial communications component comprising at least one repeater and at least one mobile switching center. The at least one gateway and the at least one mobile switching center are coupled together by a first mobile applications part network. The at least one gateway and the at least one mobile switching center are further coupled to a terrestrial communications network. The system further includes at least one dual mode or higher (e.g., tri-mode) user terminal comprising a first transceiver for bidirectionally communicating with the gateway through the satellite, a second transceiver for bidirectionally communicating with the mobile switching center through the repeater, and a controller, responsive to one of a user selected or a gateway selected protocol, for selectively enabling either the first or the second transceiver for conveying a user communication to the terrestrial communications network.

Different service providers may use different air interface standards and related signalling protocols (e.g., IS-41 and IS-95). Such air interface standards and signalling protocols may be collectively referred to simply as a "protocol", which is assumed for the purposes of this invention to encompass the physical and logical requirements to successfully communicate with a given satellite or terrestrial communication system.

The user terminal is responsive to a number of initial conditions (C). These include (a) operation through satellite only; (b) logged into the satellite system but authorized to switch to the terrestrial system; (c) logged into both the satellite and terrestrial systems, and an automatic network search mode begins with the satellite system; (d) logged into the terrestrial system only; (e) logged into the terrestrial system but authorized to switch to the satellite system; and (f) logged into both the satellite and terrestrial systems, and the automatic network search mode begins with the terrestrial system.

BRIEF DESCRIPTION OF THE DRAWINGS

The above set forth and other features of the invention are made more apparent in the ensuing Detailed Description of the Invention when read in conjunction with the attached Drawings, wherein:

FIG. 6A–8B are block diagrams of embodiments of gateways in accordance with this invention.

DETAILED DESCRIPTION OF THE INVENTION

When reading the following detailed description of this invention reference may also be had to U.S. Pat. No. 5,303,286, entitled "Wireless Telephone/Satellite Roaming System", by R. A. Wiedeman; to U.S. Pat. No. 5,448,623, entitled "Satellite Telecommunications System Using Network Coordinating Gateways Operative with a Terrestrial Communication System", by R. A. Wiedeman and Paul A. Monte; and to U.S. Pat. No. 5,422,647, entitled "Mobile Communication Satellite Payload", by E. Hirshfield and C. A. Tsao. The disclosures of these U.S. Patents are incorporated by reference herein in their entireties for describing various satellite communications systems using on-board signal processing satellites or bent-pipe repeater satellites, and also an embodiment of a repeater satellite payload.

Figure 1:
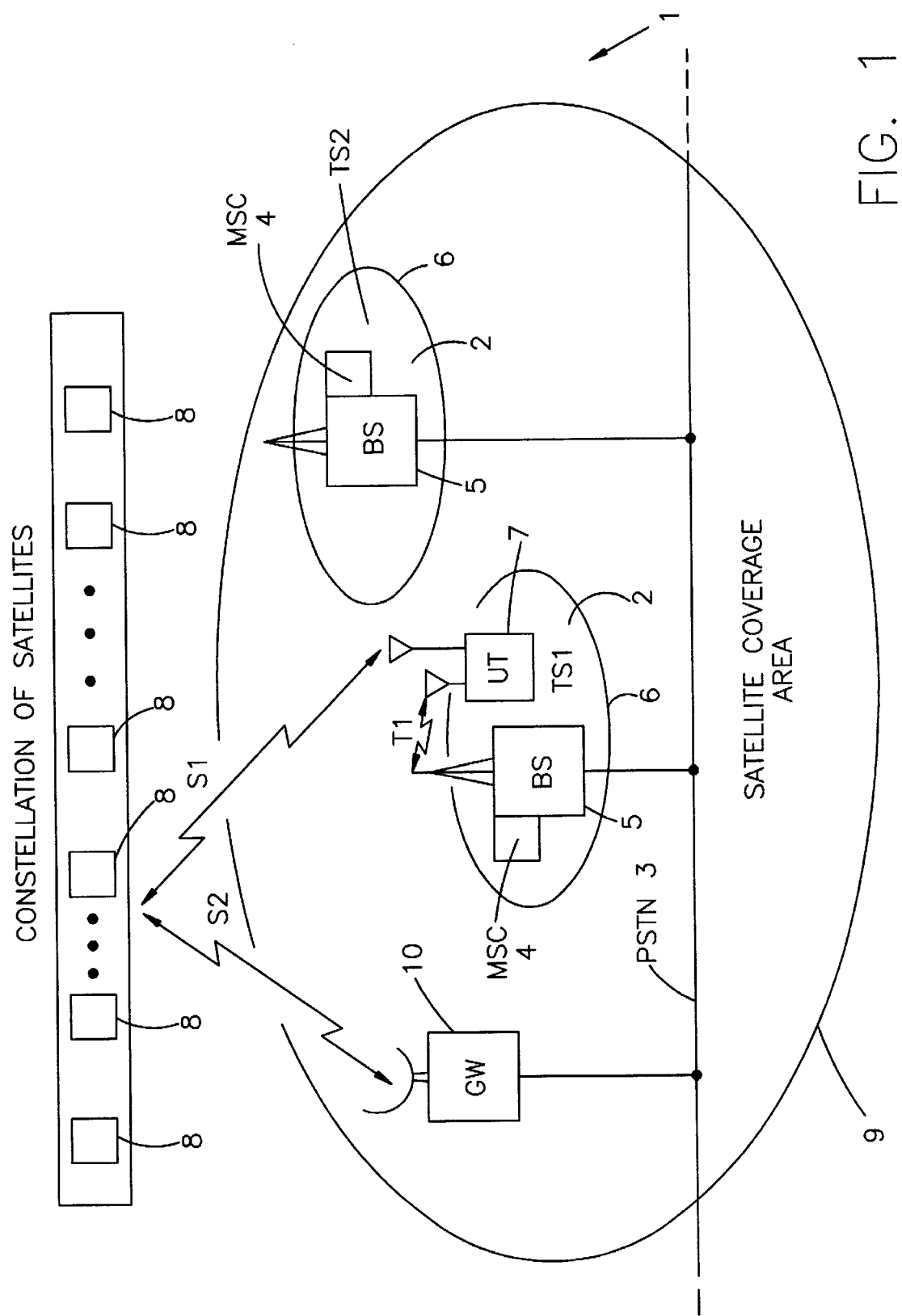
FIG. 1 is a block diagram of a satellite/terrestrial communication system in accordance with this invention.

FIG. 1 illustrates a dual mode satellite and terrestrial communication (DMSTC) system 1 that is suitable for use in practicing the teachings of this invention. In the DMSTC system 1 there is at least one terrestrial system (TS1) 2, but typically there are a plurality of same all connected directly or indirectly to the Public Switched Telephone Network (PSTN) 3. Some of the TSs 2 may be connected to a private network. Each TS 2 includes a conventional Mobile Switching Center (MSC) 4 and at least one base station (BS) 5. Each MSC 4 has associated coverage areas 6 within which a user terminal (UT) 7 can be located. Using a bidirectional terrestrial RF link (T1) the UT 7 can be connected to the PSTN 3. Different ones of the TSs 2 can operate with protocols and air interface standards, such as analog (e.g., AMPS), time division multiple access (TDMA), code division multiple access (CDMA), and combinations of these access types. There may be various TSs of one access type (e.g., TDMA) that operate with different protocols (e.g., U.S. digital and GSM).

FIG. 1 also includes at least one satellite system which includes at least one satellite 8, but more typically a constellation of two to N satellites each orbiting the earth and providing respective service or coverage areas 9 on the earth's surface. The coverage area may be from a single satellite and may be composed of from one to many beams (or frequencies), or may be composed of many overlapping coverage areas from several satellites, each being composed of one to many beams. Located within the satellite coverage area 9, and possibly within a terrestrial service area 6, is the UT 7 and also a gateway 10 which interconnects the UT 7 to the PSTN 3 via one or more of the satellites 8 through bidirectional satellite RF links S1 (UT 7 to satellite 8) and S2 (satellite 8 to GW 10).

The constellation of satellites may be comprised of Low Earth Orbit satellites (LEOs), Medium Earth Orbit satellites (MEOs), or geosynchronous orbit (GEO) satellites. For the purposes of this invention the satellites may be bent pipe repeaters that simply relay communications between the UTs 7 and the gateways 10, or they may demodulate received transmissions to perform on-board processing for determining routing and other information.

In the presently preferred embodiment of this invention the UT 7 is a dual (or higher) mode terminal and is capable of operating within either the satellite coverage area 9 or at least one of the terrestrial service areas 2. That is, the UT 7 has the capability of communicating with both the satellite system and at least one terrestrial system. By example, the UT 7 may be capable of communication with either an AMPS or a CDMA terrestrial communication system, and with at least one type of satellite communication system.

Thus, although the description of this invention is made in the context of the dual mode UT 7, it should be realized that the teachings of this invention apply as well to tri-mode and greater user terminals (e.g., satellite and multiple terrestrial standards such as GSM, and/or IS-95 CDMA, and/or AMPS).

One feature of both satellite and terrestrial systems is a registration procedure (log-on) which allows the UT 7 to access the system and thence the PSTN 3. The registration procedure authenticates the UT 7, allows various services, and performs various database manipulation functions. There are at present two types of registration procedures: home location procedures, and roaming or so called visitor location functions. The registration procedures are performed at the MSC 4 for terrestrial systems and the gateway 10 for satellite systems.

In general, the registration process is a manipulation of two types of databases. In the home location there is a Home Location Register (HLR) and for roaming terminals (i.e., one whose home location is in another service area) there is a Visitor Location Register (VLR).

There are currently two major types of cellular telephones deployed in the world. In the Americas the AMPS (IS-41) system is prevalent, while in the remainder of the world various other standards are used, with GSM being the most popular. These various standards are not usually inter-operable and inter-working, and functions such as charging, mobility management, and authentication are not compatible between them. However, the addition of the satellite system makes it possible to roam from system to system with some limitations. Two potential roaming cases are, by example, AMPS and satellite cellular, and GSM and satellite cellular.

The potential operating conditions are shown in Table 1.

TABLE 1

| Mode<br>Cellular Type<br>Operation → | Terrestrial<br>AMPS<br>Home | Terrestrial<br>AMPS<br>Roaming | Terrestrial<br>GSM<br>Home | Terrestrial<br>GSM<br>Roaming |
|---|---|---|---|---|
| Terminal<br>Type ↓ | | | | |
| AMPS<br>&<br>Satellite | Yes | Yes | No | No |
| Auto Dual Mode | Yes | Yes | No | No |
| GSM &<br>Satellite | No | No | Yes | Yes |
| Auto Dual Mode | No | No | Yes | Yes |
| Mode<br>Cellular Type<br>Operation → | Satellite<br>AMPS<br>Home | Satellite<br>AMPS<br>Roaming | Satellite<br>GSM<br>Home | Satellite<br>GSM<br>Roaming |
| Terminal<br>Type ↓ | | | | |
| AMPS<br>&<br>Satellite | Yes | Yes | Yes | Yes |
| Auto Dual Mode | Yes | Yes | No | No |
| GSM &<br>Satellite | Yes | Yes | Yes | Yes |
| Auto Dual Mode | No | No | Yes | Yes |

In Table 1 it can be seen that the dual mode AMPS and satellite cellular UT 7 can: a) operate in an AMPS cellular system in either a home or roaming location as a terrestrial user; or b) can operate in a satellite gateway 35 in conjunction with an AMPS system either as a home or roaming location as a satellite user; or c) can operate in a satellite gateway in conjunction with a GSM system as a satellite user only. The dual mode AMPS plus satellite cellular phone or UT can thus be activated to automatically switch between (a) and (b) above if properly registered. This mode is referred to herein as an AMPS plus satellite automatic dual mode.

Referring again to Table 1 it can be seen that a dual mode GSM plus satellite cellular terminal can: d) operate in a GSM cellular System in either a home or roaming location as a terrestrial user; or e) can operate in a satellite gateway in conjunction with a GSM system either as a home or roaming location as a satellite user; or f) can operate in a satellite gateway in conjunction with an AMPS system as a satellite user only.

The dual mode GSM plus satellite cellular phone or UT 7 can be activated to automatically switch between (d) and (e) above if properly registered. This mode is referred to herein as a GSM plus satellite automatic dual mode.

The UT 7 can also be configured to switch between the satellite system and either a CDMA or an AMPS terrestrial system, depending on the availability of AMPS or CDMA in the terrestrial network. A quad-mode phone which includes another terrestrial standard such as GSM (e.g., satellite, AMPS, CDMA, or GSM) is also within the scope of this invention.

It can be seen that there are six initial conditions for each type of dual mode UT 7 described above. These initial conditions (C) are as follows:

C1 UT logged into only the satellite system;

C2 UT logged into satellite but authorized to switch to the terrestrial system;

C3 UT logged into satellite and terrestrial systems, and an automatic system search mode begins with the satellite system;

C4 UT logged into terrestrial system only;

C5 UT logged into terrestrial system but authorized to switch to satellite; and

C6 UT logged into both satellite and terrestrial systems, and the automatic search mode begins with the terrestrial system.

It is one stated object of this invention to provide a multiple mode UT 7 with the ability to select or have selected for it a preferred initial condition, and to provide a mechanism for automatic switching between these conditions. This object is accomplished in accordance with the invention as described now below.

Initial Condition C1: UT 7 Operation Through Satellite Only

In this condition the user at UT 7 turn on attempts to register into the satellite system. In this case several situations are possible. A first situation is that the UT 7 is located in poor satellite propagation conditions and fails to register. A second situation is that the UT 7 is not located in an authorized service area. In this case the UT 7 can be signaled to display the result. A third situation is that the UT 7 is successful in registering into the satellite system, either by being in a home system or having roamed into the system. A fourth situation is that the UT 7 receives a "bad" answer.

Figure 2A:
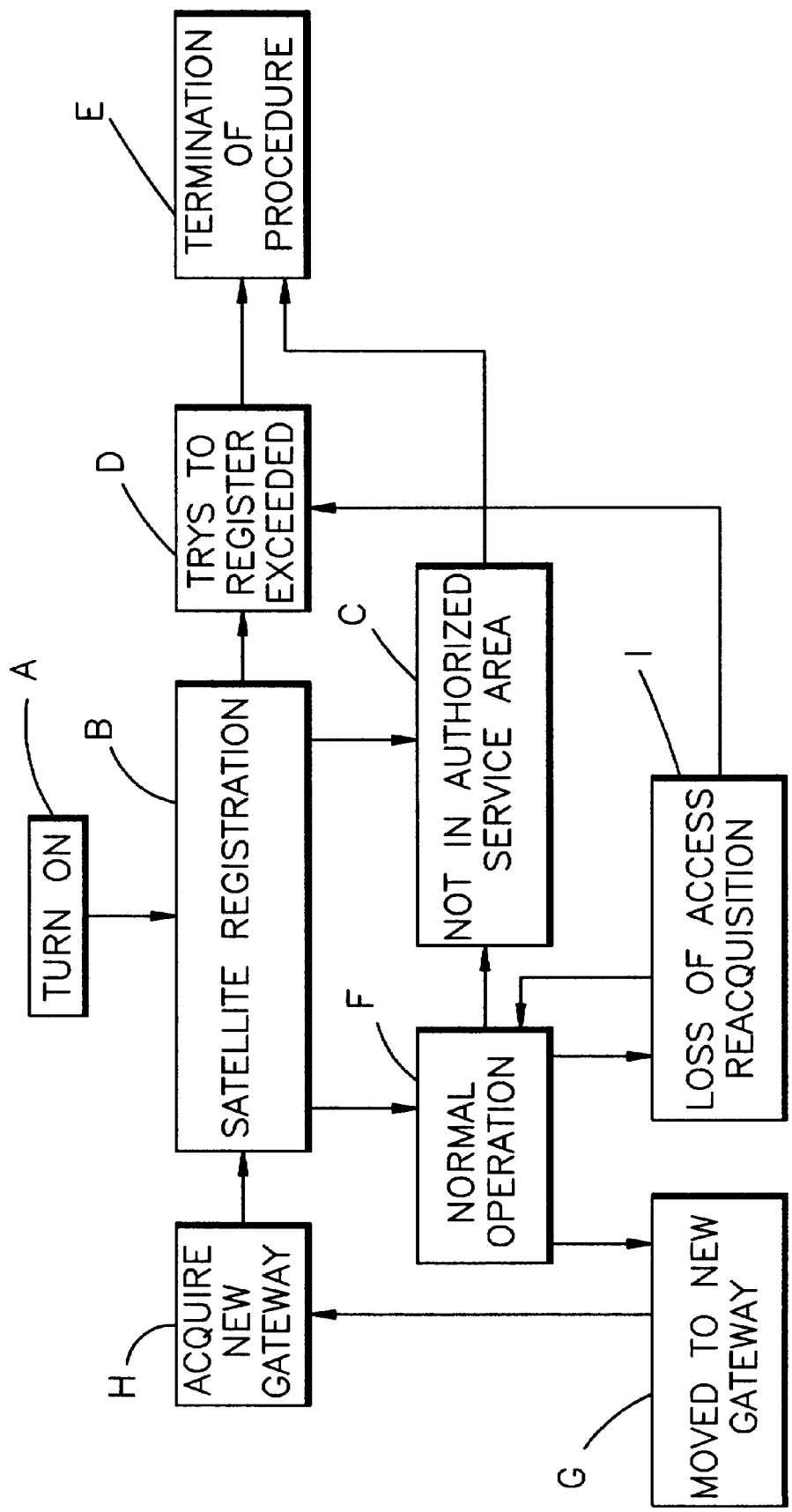
FIGS. 2A–3D are logic flow diagrams depicting methods in accordance with this invention for operating a dual mode (satellite/terrestrial) user terminal in the satellite/terrestrial communications system of FIG. 1.
Figures 1, 2B:
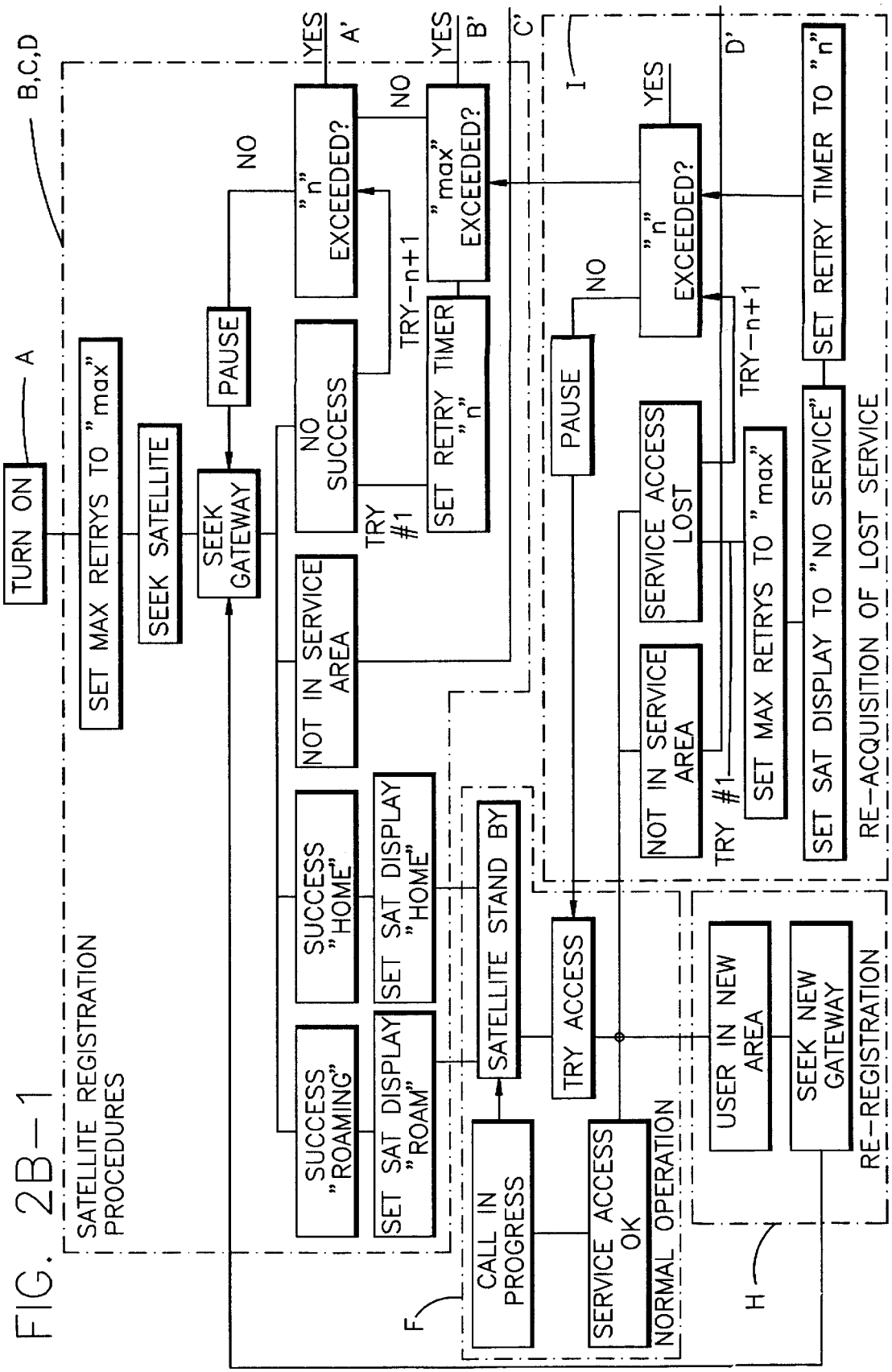
Figures 2, 2B:
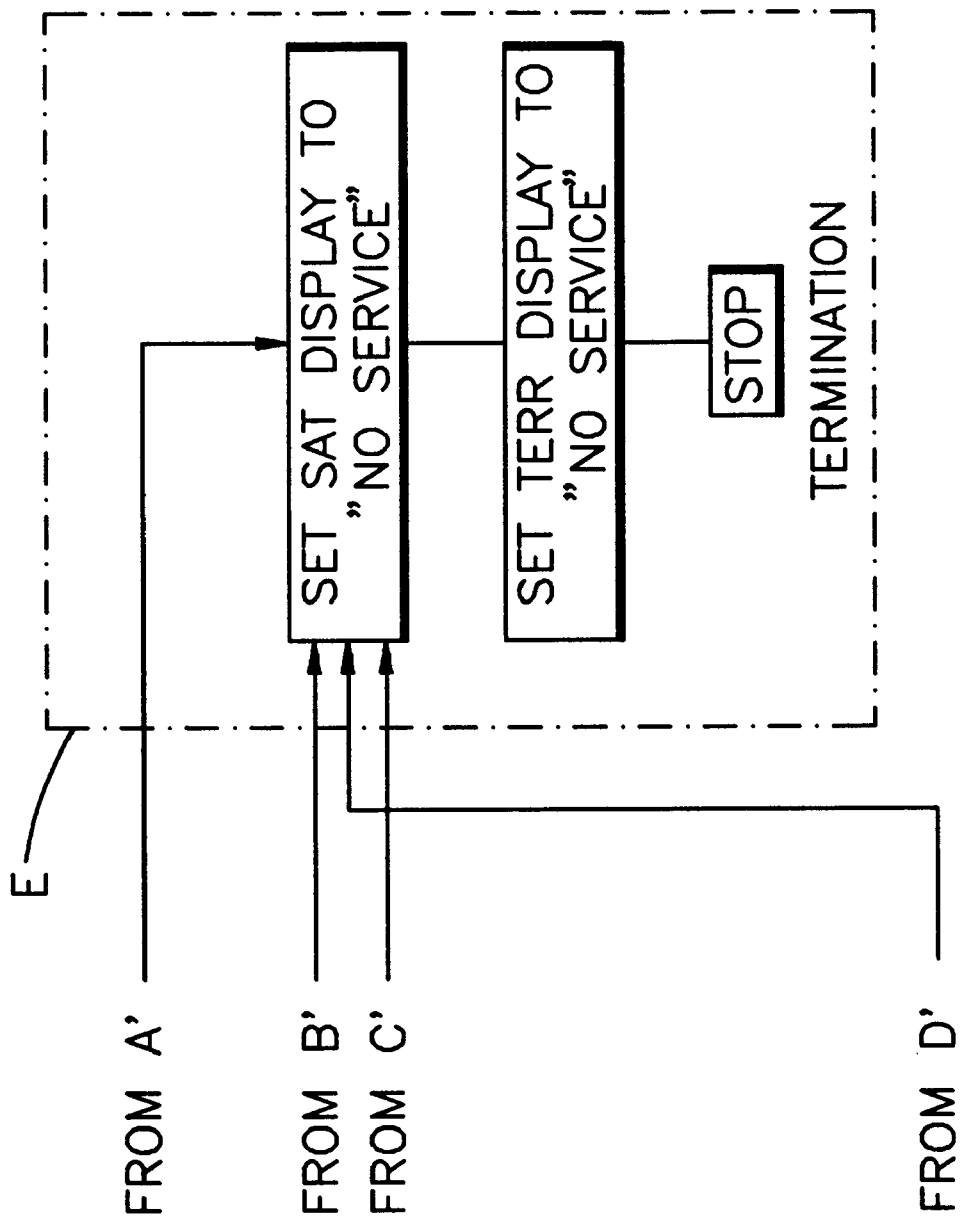

This procedure is shown generally in FIG. 2A and in greater detail in FIG. 2B. Referring to FIGS. 2A and 2B, at UT 7 turn on (Block A) the UT 7 may seek either the satellite or terrestrial system(s) depending on user preferences preset into the UT 7 or as modified by the gateway 10. If configured to first seek the satellite system (Block B), but if the UT 7 is not in the satellite service area, such as if it is in an adjacent country which does not authorize satellite service (Block C), or if there is no success due to propagation conditions or obtaining a "bad" answer, the UT 7 sets a retry timer or counter to some value, which may be constant or vary with the number of tries. Subsequently at Block D a check is made to determine if the number of registration attempts has exceeded the retry timer or counter value. If so, the registration procedure is terminated at Block E.

A "bad" answer is considered herein to be one of the following. First, the PLMN selected is not supported by the subscription. Second, the service area is not suitable because it is not supported by a regional subscription (i.e., a virtual gateway). That is, it may be that while a regional subscription is allowed a specific PLMN selection may not be. Third, the service area may be in a location which does not accept roamers of another PLMN of the same country. Other conditions may also result in the UT 7 obtaining a "bad" answer.

If the number of tries which are set are exceeded at Block D then the UT 7 may set a satellite access display to "No Service". A pause may be used (either by command, or by manual override) to allow the UT 7 to move to a better location for propagation conditions.

If at Block B the UT 7 has successfully signaled the satellite constellation and gateway 10 network (the preferred embodiment being a network coordinating gateway), a communications link is established through the satellite system only. Once the UT 7 is authenticated, is assigned to a gateway, and has been assigned a paging and access channel, the UT 7 is in a standby mode (Block F) and is ready to receive calls from the PSTN 3 or to request the gateway 10 to set up a call to the PSTN. The UT 7 remains in this condition until the UT 7, when setting up a call or in a set up procedure for receiving a call, is found by the gateway 10 to have moved to another service area (Block G) In this case the UT 7 is registered into the new service area (Block H). Should the UT 7 lose contact due to propagation or other effects when a call is in progress, the user can be dropped (i.e. the call is terminated). At loss of contact the UT 7 must normally wait until propagation conditions permit reacquisition of the satellite system (Block I). Likewise, if the UT 7 is located in a poor propagation location the UT 7 will not respond to a page that notifies the UT 7 of an incoming call, or a UT 7 originated access request will not be heard by the gateway 10 and thus the gateway 10 cannot respond.

In other words, so long as the UT 7 is logged or registered to the gateway 10, is located in the service area, and the RF propagation conditions allow communications, the UT 7 has satellite service (Block F). In this condition the terrestrial system 2 is not used.

If the UT 7 loses access due to propagation conditions, or a bad answer, or if the user has moved to a location which does not authorize service, the UT 7 sets the maximum tries to a predetermined value (which value may be a constant or may be set from the gateway 10 by command). The UT 7 displays a "Satellite-No Service" message to the user or otherwise indicates a no service condition, sets the retry timer to "N", and retries the registration procedure. A pause may be used (either by command, or by manual override) to allow the UT 7 to be moved to a better location for propagation conditions. If "N" is exceeded (Block D) it may be that the user must re-log into the satellite system, in this case the retry is looped to seek the satellite once again. In order to prevent endless looping a "MAX" retry counter is incremental, when "MAX" is exceeded the satellite display is set to "No Service" and the procedure stops.

Initial Condition C2: User Operation Initially Through Satellite with Operation Authorized to Switch to Terrestrial Systems In this condition the user at UT 7 turn on attempts to register into the satellite system. In this case several situations are possible, which are similar to those described above with respect to condition C1. A first situation is that the UT 7 is located in poor satellite propagation conditions and fails to register. A second situation is that the UT 7 is not located in an authorized service area. A third situation is that the UT 7 is successful in registering into the satellite system, either by being in a home system or having roamed into the system.

Figure 3A:
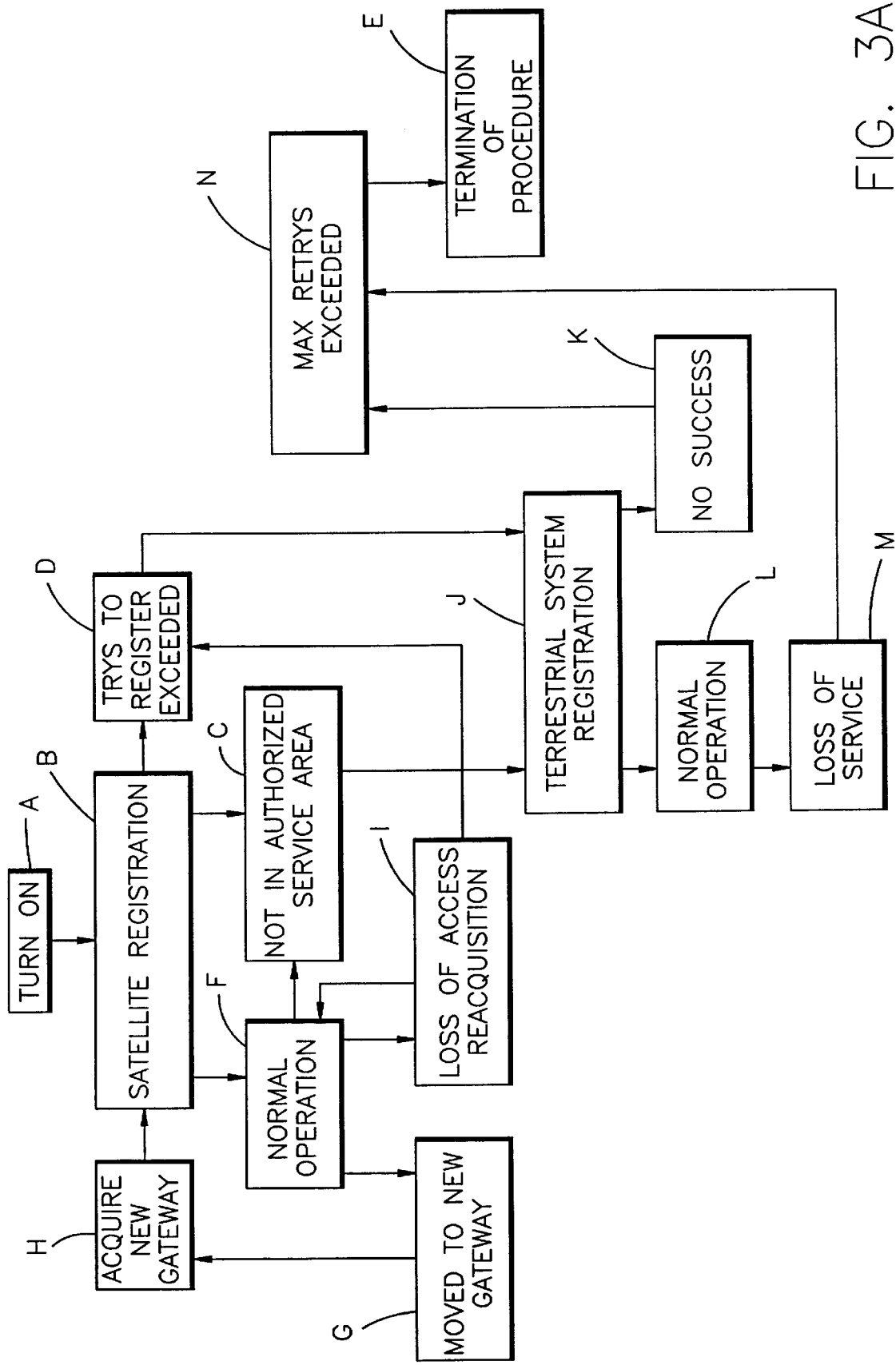
Figures 1, 3B:
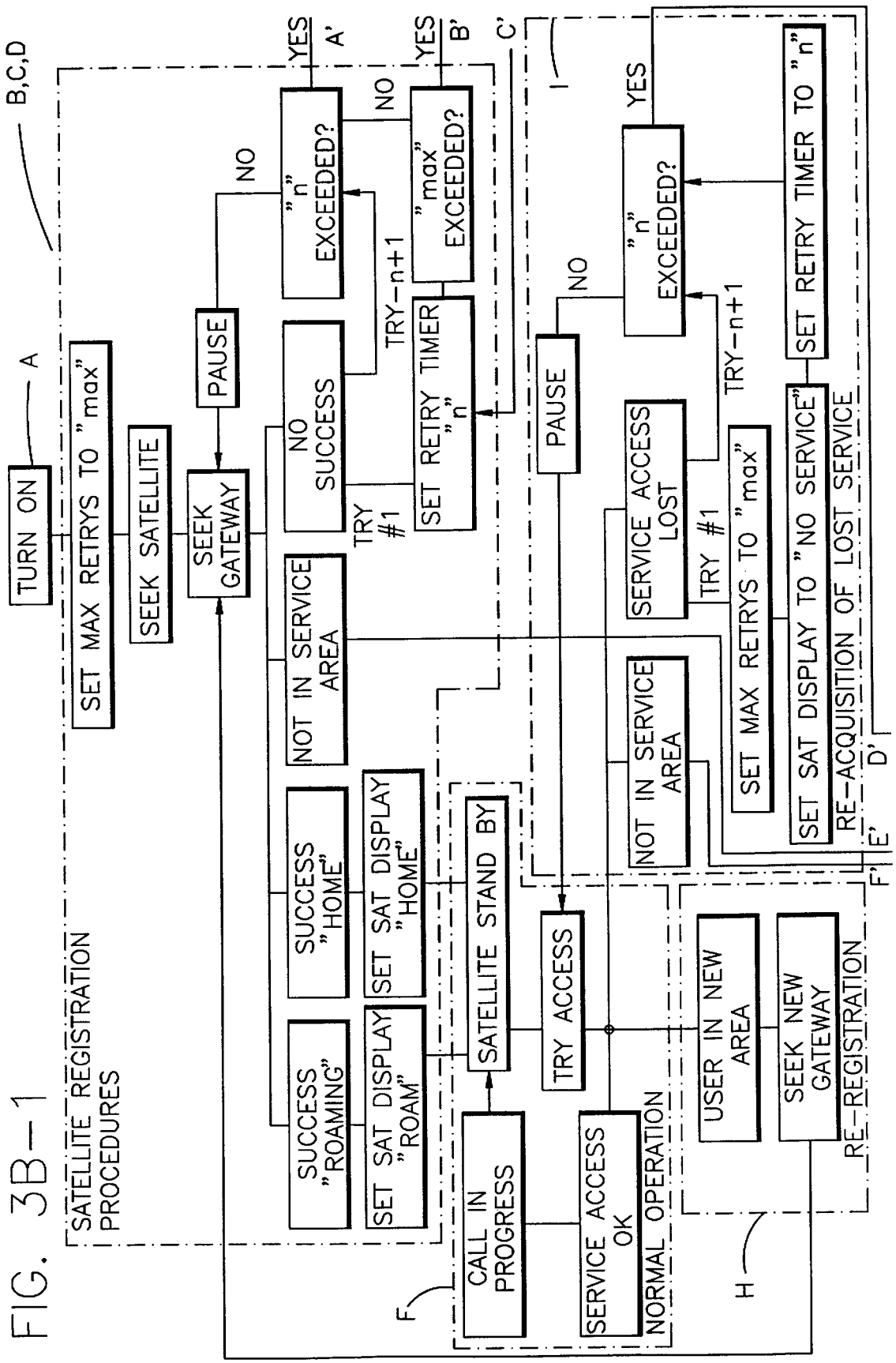
Figures 2, 3B:
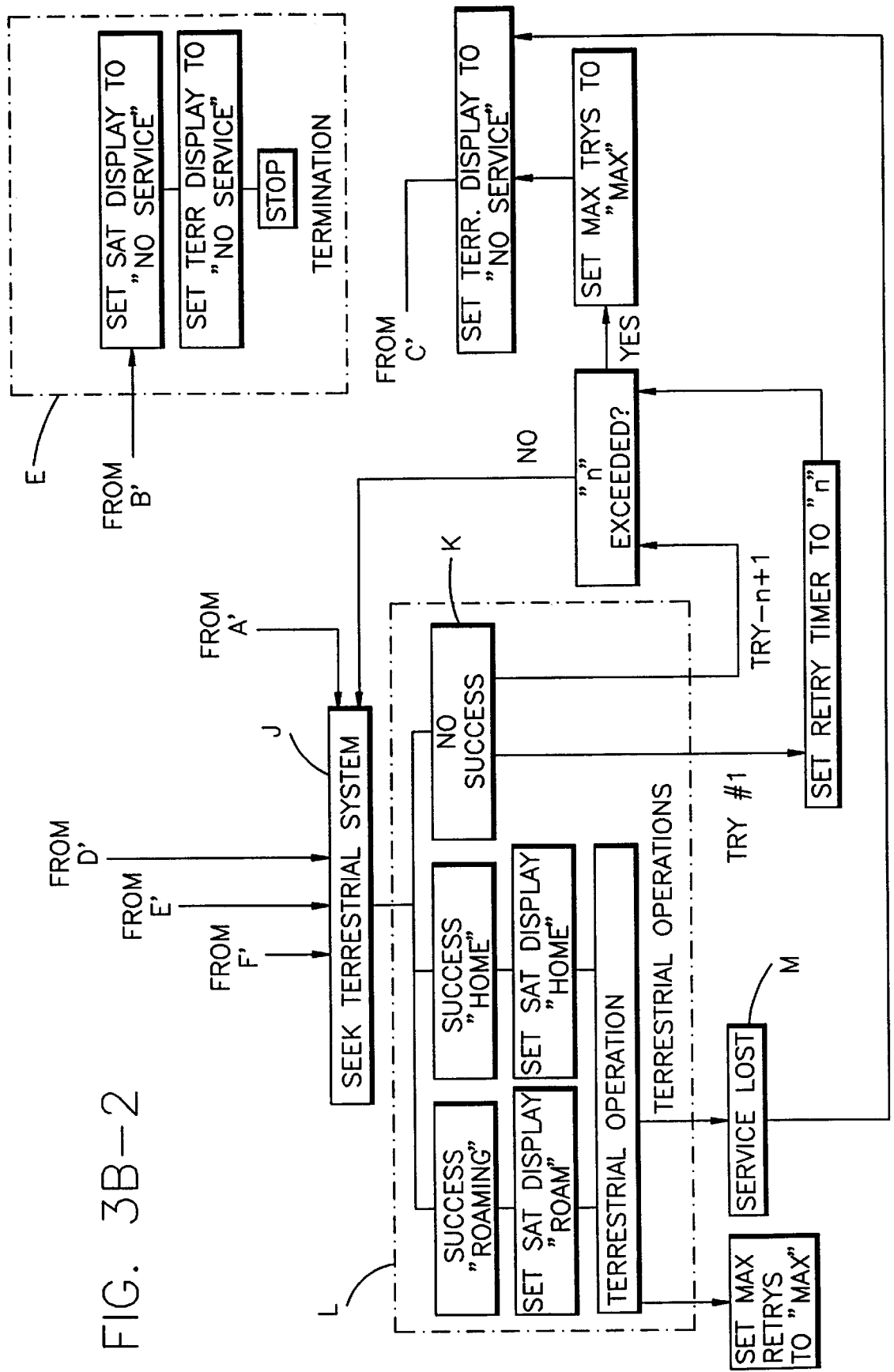

The procedure is shown in FIGS. 3A and 3B, wherein Blocks A–D and F–I are as described above. Block E is also the same, but is not reached directly from Block B, C or D as was described above. At turn on (Block A) the UT 7 first seeks to register to the satellite system (Block B). If the UT 7 is successful, the UT 7 goes to stand by and is active (Block F). If not successful, due to being located in a non-authorized service area (Block C), the UT 7 begins to seek terrestrial system (Block J). If not successful in registering to the satellite system due to propagation conditions or receiving a bad answer, the UT 7 sets the retry timer. The UT 7 then loops (Block D) while retrying to register with the satellite system. After "N" tries the UT 7 begins to seek the terrestrial system (Block J).

When successfully logged into the satellite system (Block F) several situations can occur. These are as follows.

First, the service areas may be authorized with the UT 7 originating and receiving calls successfully. After each such call the UT 7 loops back to stand by.

Second, the UT 7 may have moved into a new service area (Block G). The present gateway 10 instructs the UT 7 to seek the new satellite gateway and, in response, the UT 7 enters the seek satellite system sequence (Blocks H and B).

Third, the UT 7 may find that it has moved into a location which does not have authorized satellite service (Block C). This location may or may not have authorized terrestrial service. In this case the gateway 10 may instruct the UT 7 to seek terrestrial service.

Fourth, the UT 7 may experience loss of service due to poor propagation conditions (Block I). In this case the UT 7 sets the retry timer, loops to stand by, and retries access. As before, a pause of some fixed length or variable length, between retries, may be used to allow the UT 7 to move to a more favorable location. After "N" is exceeded the UT 7 seeks and attempts to register with the terrestrial system (Block J).

At this time the UT 7 may have signaled the satellite gateway 10 and possibly set up communications potential through the satellite system. The UT 7 is authorized to switch to a terrestrial system upon some pre-determined condition being met. Representative ones of these preconditions are as follows.

First, UT 7 service is not available due to propagation conditions. After N attempts by the user terminal to access the gateway 10, the UT 7 switches to the terrestrial mode and attempts to register onto the terrestrial system (Blocks D and J).

Second, the UT 7 has been moved beyond the satellite authorized service area and into a region where roaming on a terrestrial system is authorized. The gateway 10, having an ability to perform a position location of the UT 7, determines this condition and instructs the UT 7 to switch to the terrestrial mode.

In any case the UT 7 responds to the inability to acquire the satellite system and seeks the terrestrial system 2 (Block J). Once logged or registered into the terrestrial system 2 the UT 7 does not return to the satellite system unless the UT 7 is turned off and then back on again (Block A), or if the UT 7 loses contact with the terrestrial system. Further loss of contact and reestablishment is conducted according to the operation of the terrestrial system 2. In any case, the UT 7 does not automatically seek the satellite system unless the number of "MAX" retries is less than the maximum set by the local service provider or other system administrator. This initial condition is important in order to prevent user terminals which have moved beyond the satellite service area boundary from making endless attempts to log on.

Still referring to FIGS. 3A and 3B, under the conditions that the UT 7 has moved to a service area which is not authorized (Block C), or that service access has been lost after N retries (Block D), the UT 7 seeks terrestrial service (J). At this time several conditions may exist, as follows.

First, the UT 7 is successful, registers into a home location in the terrestrial system 2, and begins normal operation (Block L).

Second, the UT 7 is successful, registers into a visitor (roamer) location in the terrestrial system 2, and begins normal operation (Block L).

Third, the UT 7 is not successful, or receives a bad answer (Block K).

For the first two condition the UT 7 sets the appropriate terrestrial system home or roam display indicator and goes to a stand by condition. In addition, the UT 7 sets a maximum retry counter to a predetermined value of "MAX" which will ultimately limit the number of log-in tries in order to prevent an endless loop and waste satellite system resources. The user then operates the UT 7 according to the terrestrial system parameters. If the terrestrial system service is lost (Block M) and the prescribed number of retries is exhausted (Block N), the UT 7 then retries the satellite system and loops until the retry value is exceeded. At this time the UT 7 displays a "No Service" message, and registration procedure terminates (Block E).

For the third condition listed above the UT 7 has no success in seeking a terrestrial system after "N" retries, sets "MAX" to a pre-determined value, and loops to the seek satellite procedure (Block B), resets the retry timer, and retries the satellite system. The UT 7 display indicates a "No Terrestrial Service" message, and the UT 7 registration procedure is interrupted by a pause. The pause may be of pre-determined duration, or may be manually controlled by the user. The user may determine to stop the registration procedure, to continue after moving to a different location, or to simply wait until better propagation conditions prevail.

Since "MAX" is generally less than "N", a few satellite registration attempts may be made. This allows the user to check the location and move if required until a better location is found. If "MAX" tries are exhausted, the satellite and terrestrial service display indicators are set to "No Service" and the registration procedure terminates (Block E).

Initial Conditions C3; User Operation Initially Through Satellite But Also Enabled to Auto Search Reference in this regard is made to FIGS. 3C and 3D for illustrating UT 7 methods for a first case (FIG. 3C) where the UT 7 stays in a successful system, and a second case (FIG. 3D) where the UT 7 stays in a preferred system. In general, the UT 7 at turn on seeks the satellite first, and then registers into the terrestrial system, and can switch automatically between these modes.

Figure 3C:
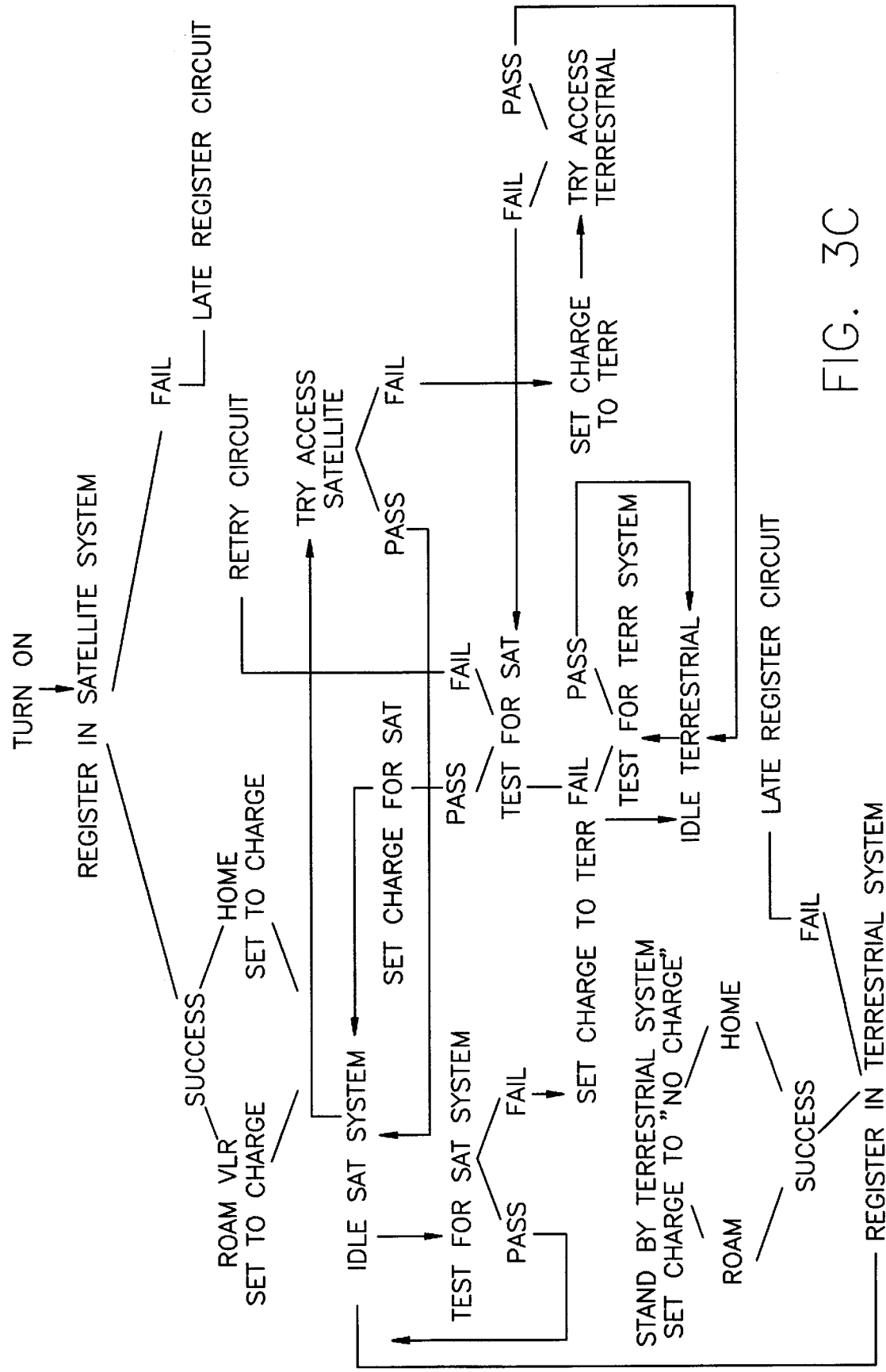

In FIG. 3C the UT 7 registers in each system (satellite and terrestrial), begins to operate in the first selected system (if successful in registering), and then goes to idle mode. Either while in idle mode, or upon a failure to obtain access to the satellite system, the UT 7 switches to the other system. In this case, the UT 7 continues in the system that it switches to until it loses that system access, upon which time it switches back to the previous system.

Figure 3D:
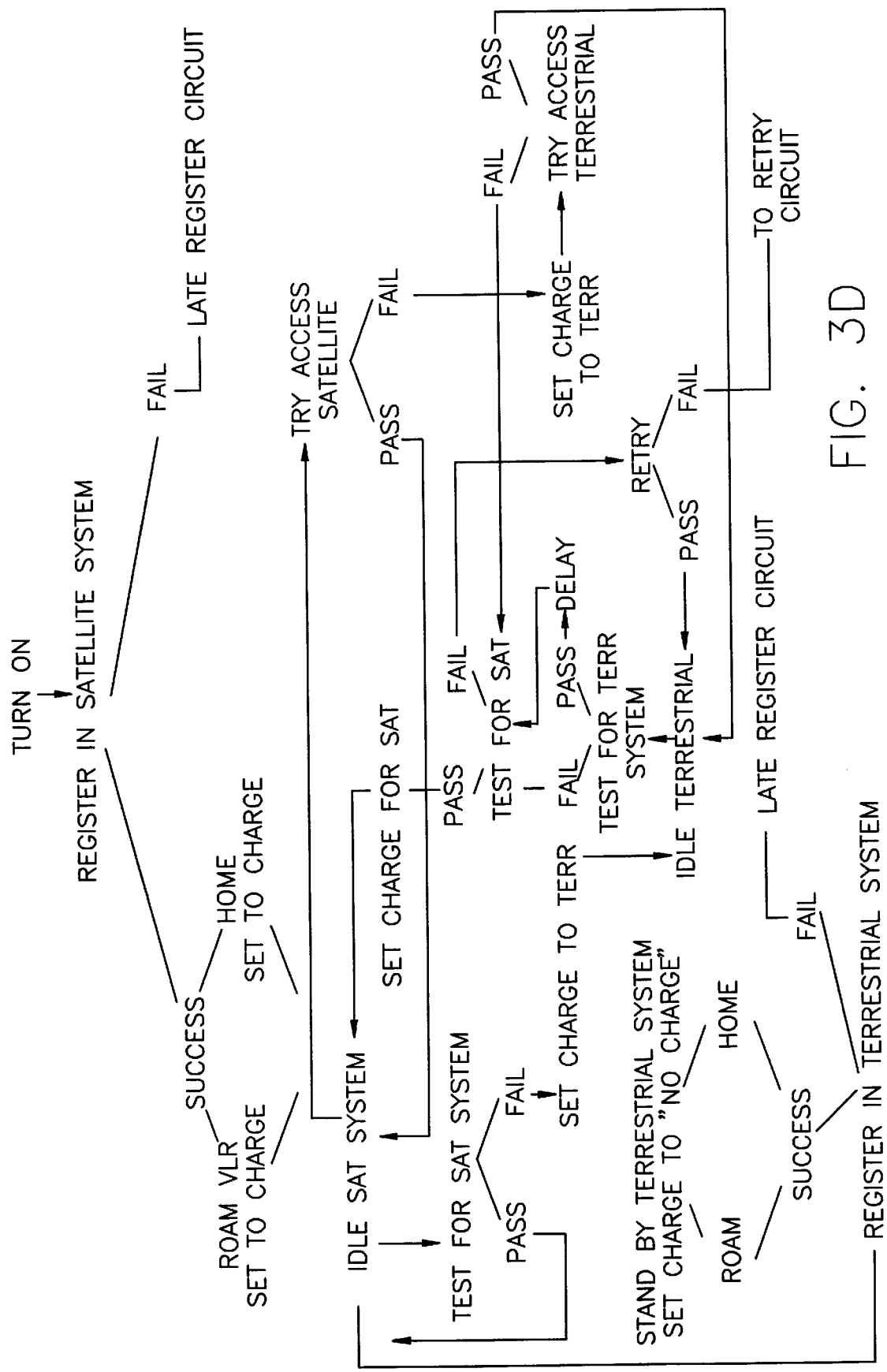

In FIG. 3D the UT 7 registers in each system, begins to operate in the first selected system (the preferred) system (if successful in registering), and then goes to idle mode. Either while in idle mode, or upon a failure to obtain access to the satellite system, the UT 7 switches to the other system and begins to operate. When in the idle mode the UT 7, after a delay, tests for the first selected system. If the test fails the UT 7 returns to the alternate system, while if the test passes the UT 7 returns to the selected system and enters the idle mode. In this manner the UT 7 attempts to stay in the preferred system, unless it is unavailable.

In greater detail, the following is an example of the operation of the automatic switching mode. It should be noted that this example is presented in the context of the "stay in preferred system" approach.

At turn on the UT 7 attempts to register into the satellite system, the procedures being similar to that shown in FIGS. 2A and 2B. If successful, the HLR or VLR of the satellite system is set to the satellite gateway 10 and the satellite display is set to "Satellite". The UT 7 then goes to the idle mode and, simultaneously, attempts to register in the terrestrial system 2. The block diagram of the registration in the terrestrial system is shown in FIG. 3B. If registration in both of these systems is not accomplished, then after an appropriate number of retries the UT 7 terminates the registration procedure. If registration in one or the other of these systems is not accomplished the UT 7 sets a late register circuit or flag (not shown) and attempts to perform the registration at a later time.

Assuming now that there is a successful registration in both systems, the following procedure is followed while the UT 7 is in the idle mode. The UT 7, in the idle satellite system state, periodically tests for the satellite system availability. If the satellite system is available (pass) the UT 7 returns to the idle satellite system state. If the satellite availability test fails, after an appropriate number of retries (not shown) the UT 7 signals the terrestrial system 2 to set its MSC/VLR or HLR to terrestrial for calling and/or billing purposes and then enters the idle terrestrial system mode. The UT 7 then periodically tests for the availability of the terrestrial system 2. If the terrestrial system availability test passes, a delay timer is set to some value. After the timer expires, the UT 7 again tests for the satellite system.

If the UT 7 determines during its periodic tests that the terrestrial system is unavailable (fail), it immediately checks for the availability of the satellite system. In either case, the UT 7 when in the idle mode eventually tests for the satellite system. If this test passes the UT 7 signals the satellite system to set its MSC/VLR or HLR to satellite for calling and/or billing purposes, and then enters the idle satellite system mode. If this test fails, the UT 7 again retries the terrestrial system which, if available, causes the UT 7 to reenter the idle terrestrial system mode. If the test fails (i.e., the terrestrial system is not available), the UT 7 retries some number of times and, if unsuccessful, terminates the procedure.

In the access mode the UT 7 eventually attempts to originate a call or request access. In this case, two possibilities can occur. First, the UT 7 is successful, upon which it returns to the idle satellite system mode. Alternatively, the UT 7 may fail (as shown in FIGS. 3A and 3B). Upon a failure the UT 7 signals the terrestrial system 2 to set the MSC/VLR or HLR to the terrestrial state for calling and/or billing reasons and then attempts terrestrial access. If successful, the UT 7 returns to the idle terrestrial system mode and begins to periodically test for the availability of the satellite system, as described above. If unsuccessful, the UT 7 retries the satellite system and, in unsuccessful, terminates the procedure.

Initial Conditions C4. C5. & C6

These conditions and procedures are similar to those described above with respect to FIGS. 3A, 3B, 3C and 3D, in the previous sections, with the respective roles of terrestrial and satellite reversed. Minor changes may be required in order to establish system compatibility.

Figures 1, 11A:
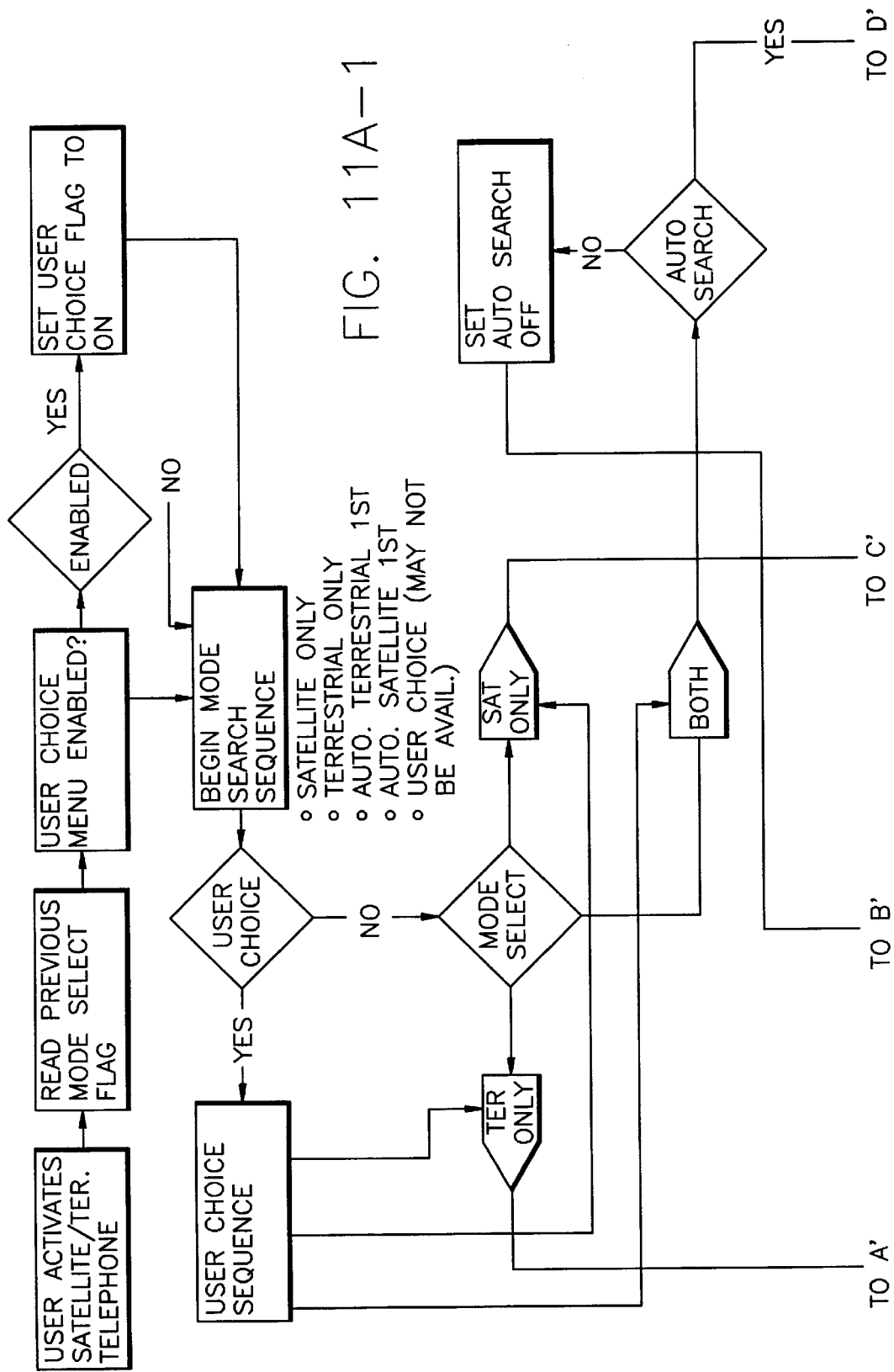
FIGS. 11A–11C are logic flow diagrams illustrating methods in accordance with this invention.
Figures 2, 11A:
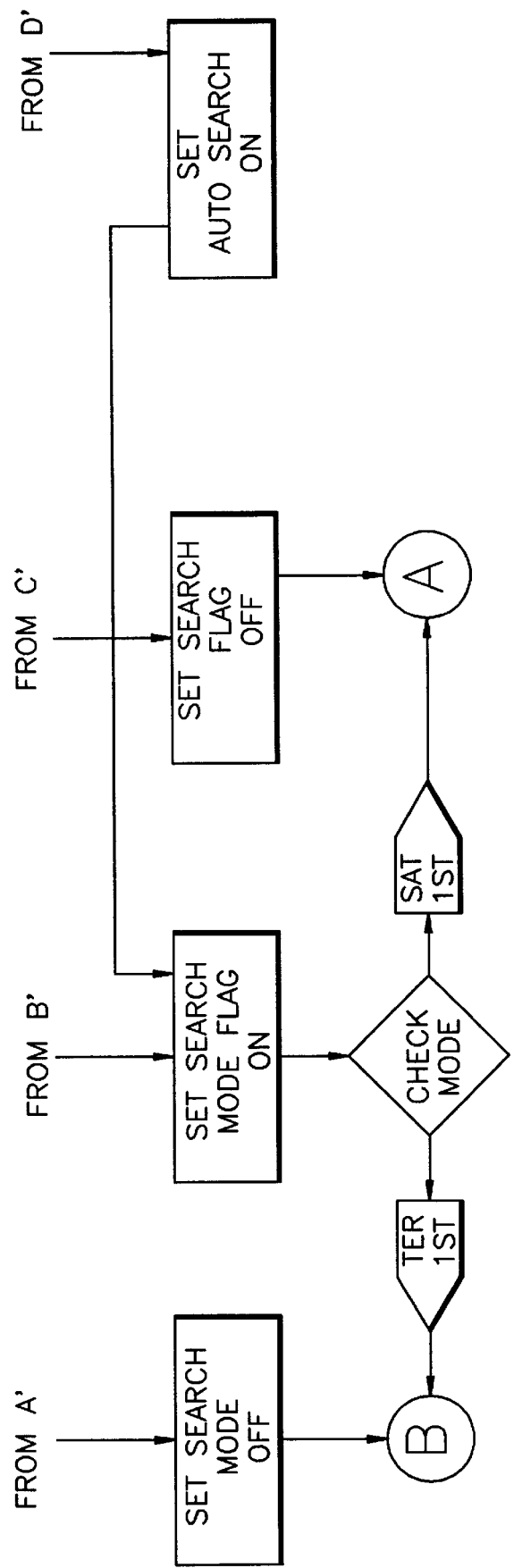
Figure 11B:
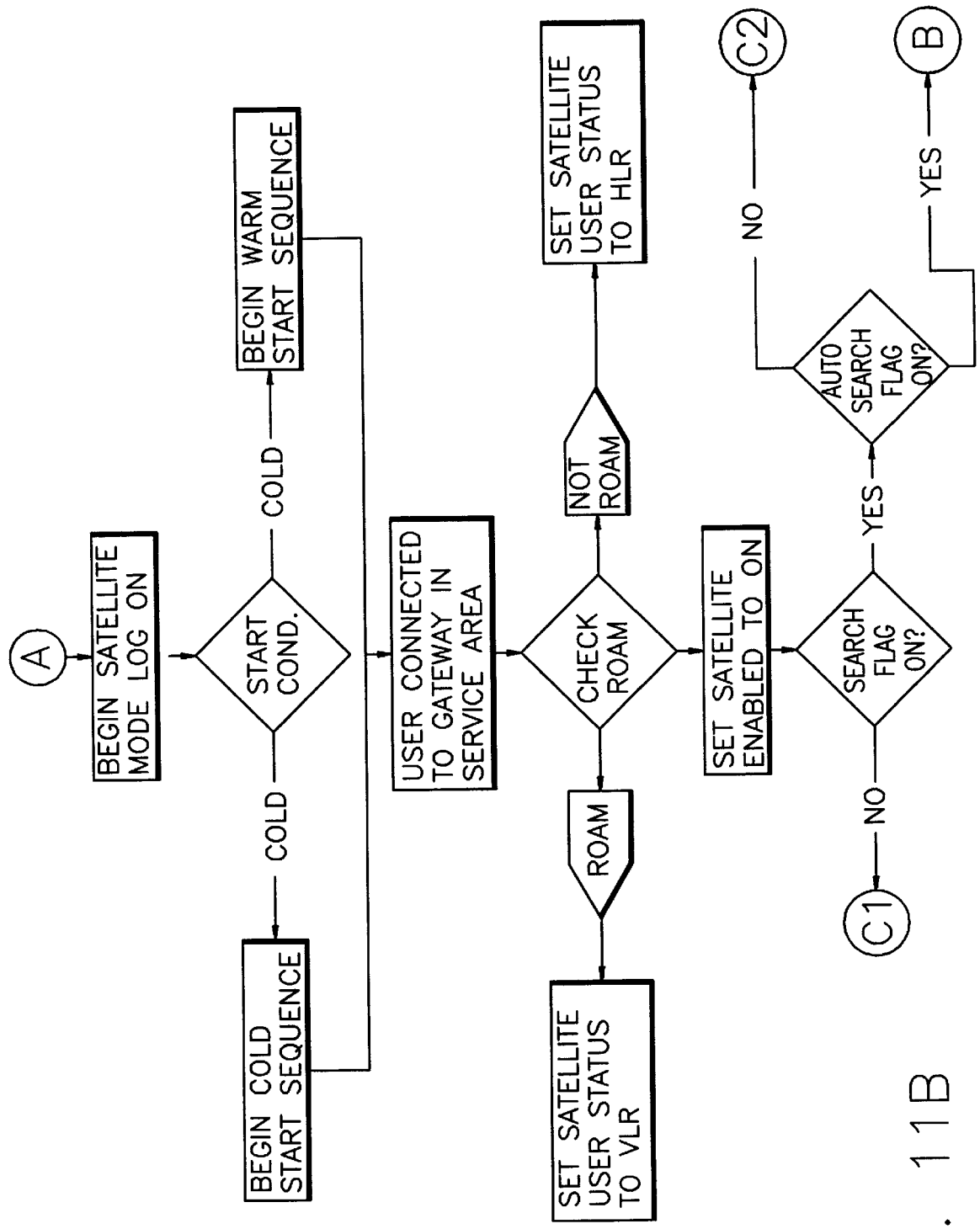
Figure 11C:
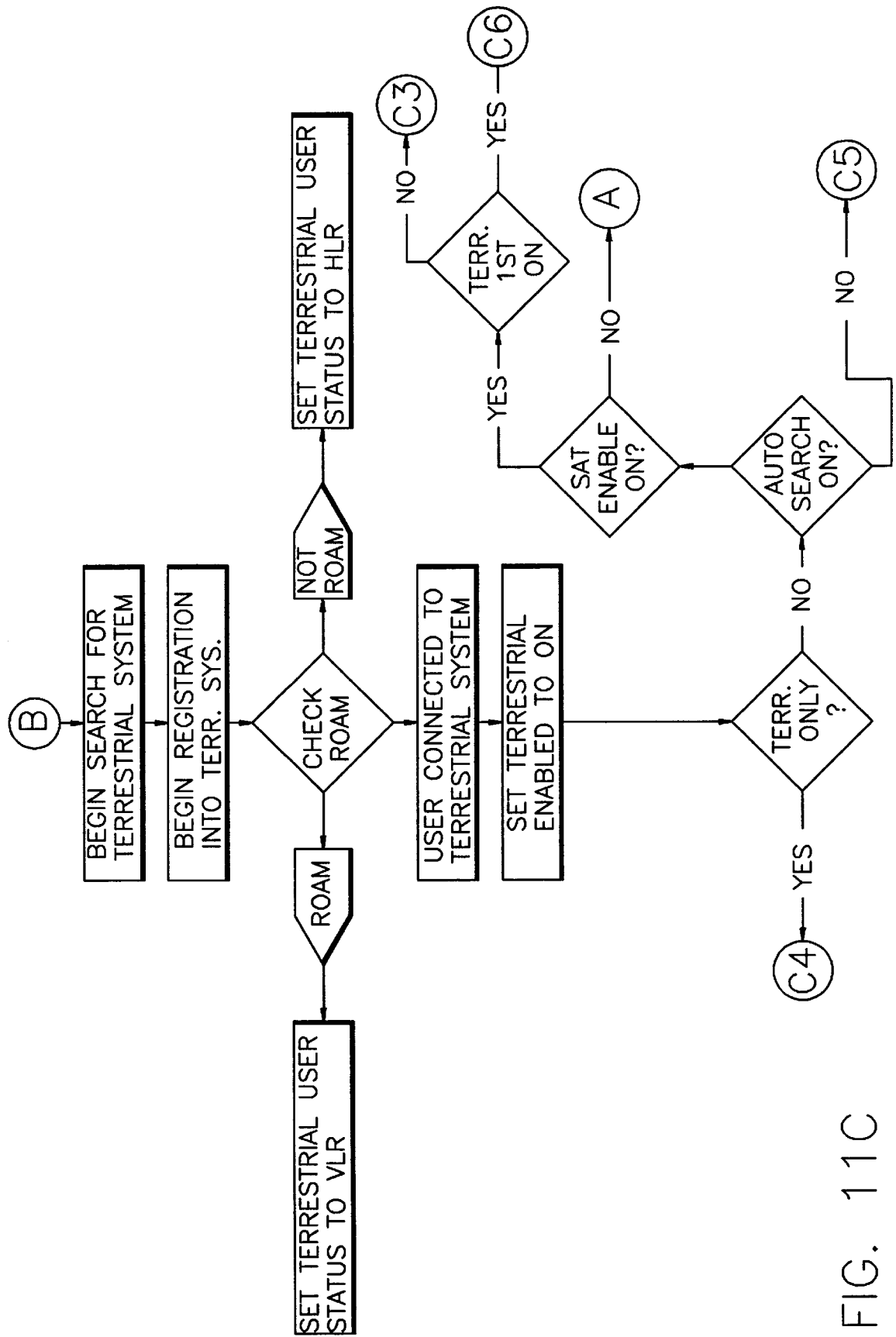
Figure 11D:
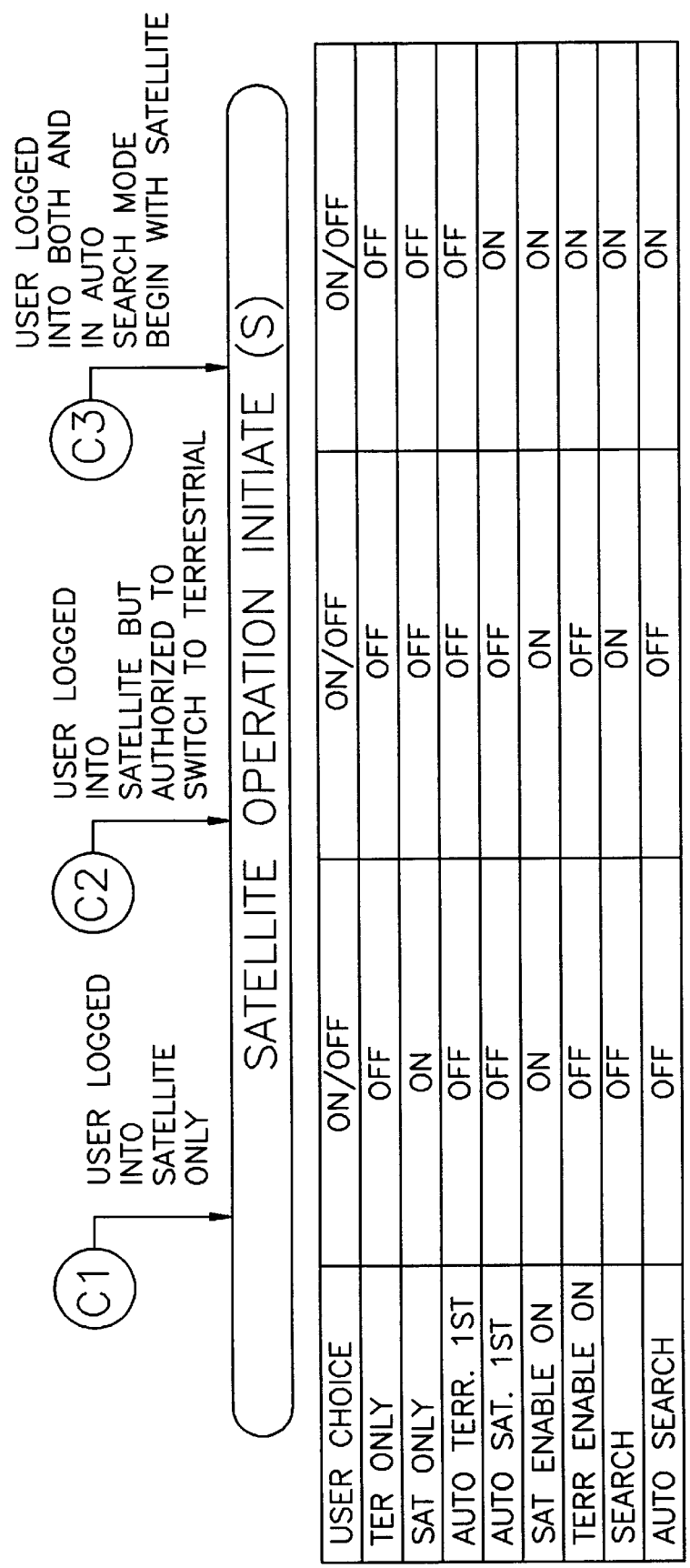
FIGS. 11D and 11E illustrate various initial conditions (C1–C6) for a satellite operation initiate mode and a terrestrial operation initiate mode, respectively, and relate particularly to the flow charts of FIGS. 11A–11C.
Figure 11E:
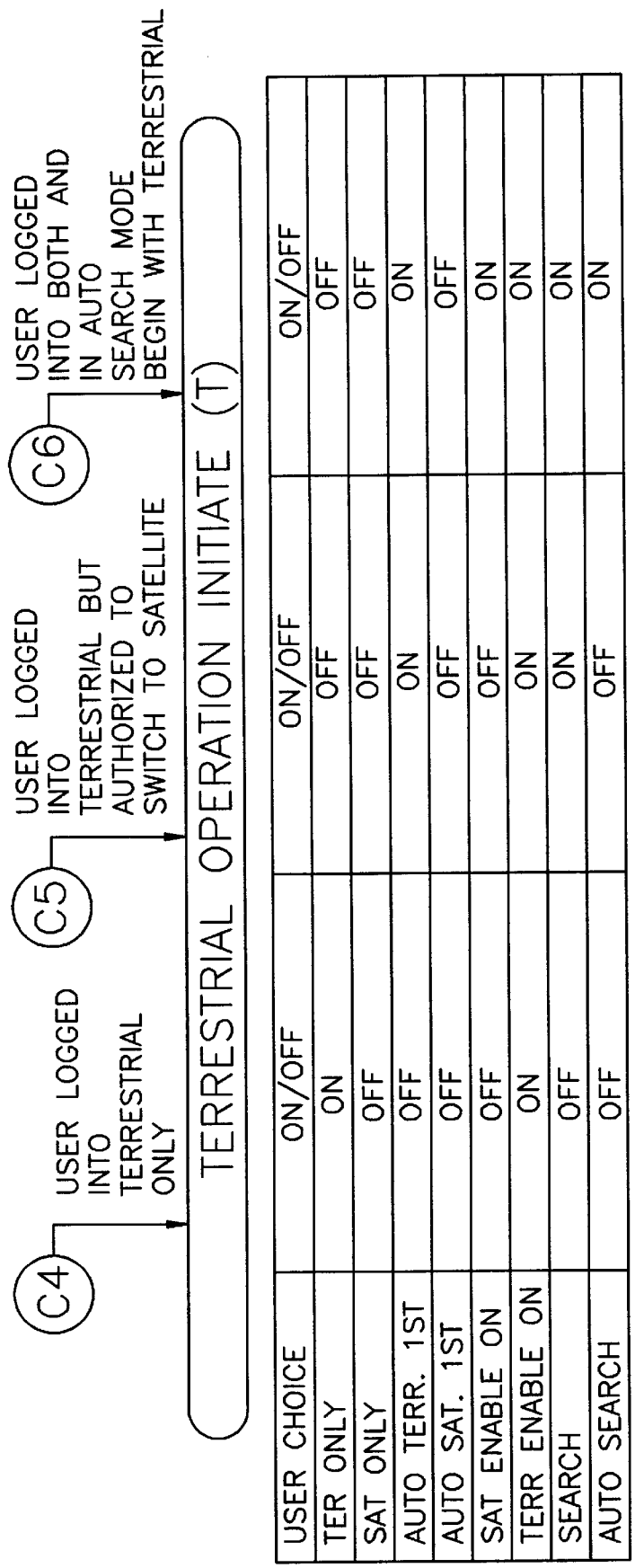

FIGS. 11A–11C are flow charts illustrating UT 7 mode selection. These flow charts show the logic and methodology for enabling the various modes to be entered at user activation of the satellite/terrestrial dual mode UT 7. The resulting process leads the user to conditions C1 to C6 as described above. These flow charts are shown for reference only and are typical of but one implementation. FIGS. 11D and 11E illustrate these various initial conditions and the status of the UT 7 for the six modes. The connectors labelled C1–C6 in FIGS. 11A–11C correspond to the conditions C1–C6 of FIGS. 11D and 11E.

Having described several presently preferred embodiments of methods in accordance with this invention, a description will now be made of the underlying hardware elements for executing these methods.

Figure 4:
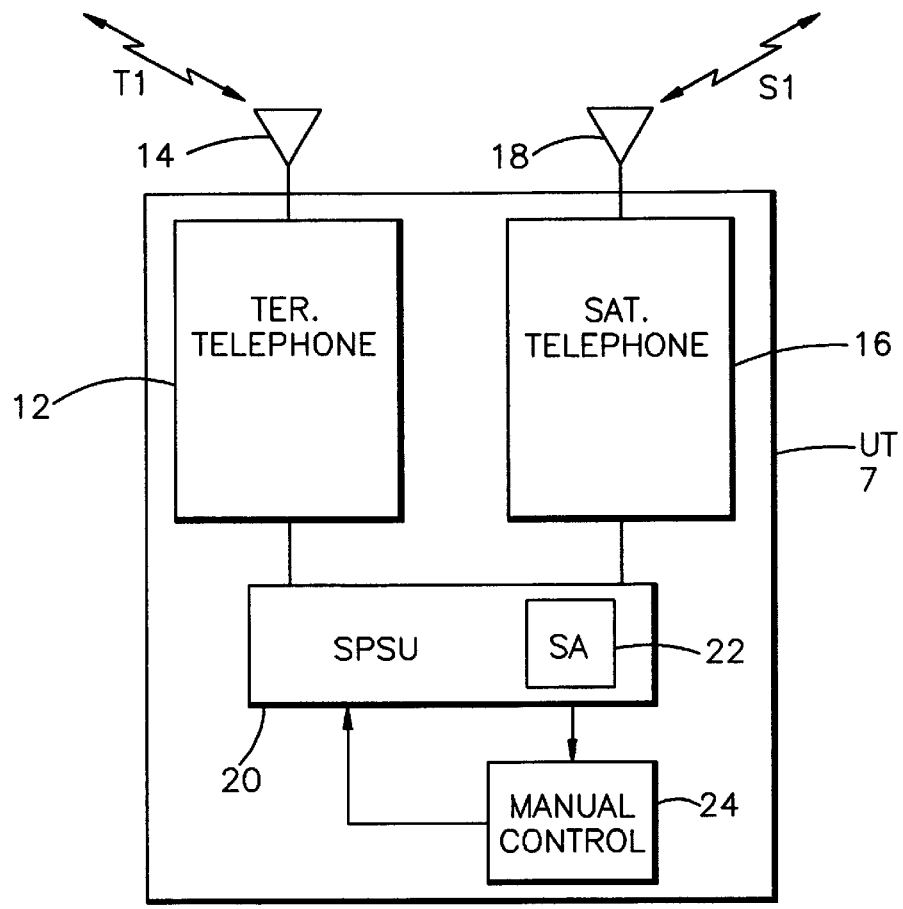
FIG. 4 is a simplified block diagram of a dual mode user terminal having system selection capabilities in accordance with this invention.

FIG. 4 is a block diagram of the dual mode UT 7. The UT 7 includes a terrestrial telephone 12 comprising a first RF transceiver with an antenna 14 which is capable of communication with an existing terrestrial telephone system 2, such as an AMPS or GSM cellular system, over RF links T1. Also included in the UT 7 is a satellite telephone 16 comprising a second RF transceiver with an antenna 18 which is capable of communicating with the satellite mobile communications system over RF links S1. Included in the UT 7 is a selection processor and switching unit (SPSU) 20 which includes selection algorithms (SA) which may be, by example, a set of scripts which are run to implement the methods described above with respect to FIGS. 2A–3D. Thus, the UT 7 is capable of executing different methods which can be chosen either by the user or by the system operator, through a suitable signalling protocol to which the SPSU 20 responds. A user-actuated manual control function 24 may be, by example, a button or a key pad entry, that is used to override any stored script or algorithm if manual override is authorized by the operator. The UT 7 signalling communications path from the gateway 10 to the UT 7 may include the ability to override or prevent manual operation by the user.

In a presently preferred embodiment of this invention the satellite telephone 16 may be capable of operating in a full duplex mode and communicate via, by example, L-band RF links (uplink or return link) and S-band RF links (downlink or forward link) through return and forward satellite transponders, respectively. The return L band RF links may operate within a frequency range of 1.61 GHz to 1.625 GHz, a bandwidth of 16.5 MHz, and are modulated with packetized digital voice signals and/or data signals in accordance with a presently preferred direct sequence (DS) code division multiple access (CDMA) spread spectrum technique. The forward S band RF links may operate within a frequency range of 2.485 GHz to 2.5 GHz, a bandwidth of 16.5 MHz. The forward RF links 17a are also modulated at the gateway 10 with packetized digital voice signals and/or data signals in accordance with the DS-CDMA spread spectrum technique.

The 16.5 MHz bandwidth of the forward link is partitioned into a plurality of channels with up to, by example, 128 users being assigned per channel. The return link may have various bandwidths, and a given UT 7 may or may not be assigned a different channel than the channel assigned on the forward link. However, when operating in a diversity reception mode on the return link (receiving from two or more satellites 8), the UT 7 can be assigned the same forward and return link RF channel for each of the satellites.

The gateway 10 communicates with the satellites 8 via, by example, a full duplex RF forward link (forward link to a satellite 8) and return link 19b (from the satellite) that operates within a range of frequencies generally above 3 GHz and preferably in the C-band. The C-band RF links bi-directionally convey communication feeder links, and also convey satellite commands to the satellites and telemetry information from the satellites.

All of the frequencies, bandwidths and the like that are described herein are representative of but one particular embodiment. Other frequencies and bands of frequencies may be used with no change in the principles being discussed. As but one example, the feeder links between the gateways 10 and the satellites 8 may use frequencies in a band other than the C-band (approximately 3 GHz to approximately 7 GHz), for example the Ku band (approximately 10 GHz to approximately 15 GHz) or the Ka band (above approximately 15 GHz).

The terrestrial telephone 12 of the UT 7 is constructed to be compatible with a desired type of terrestrial cellular air interface, such as but not limited to that specified for IS-41 (AMPS), GSM or some other time division multiple access (TDMA) digital standard, or IS-95 (DS-CDMA).

Figure 5:
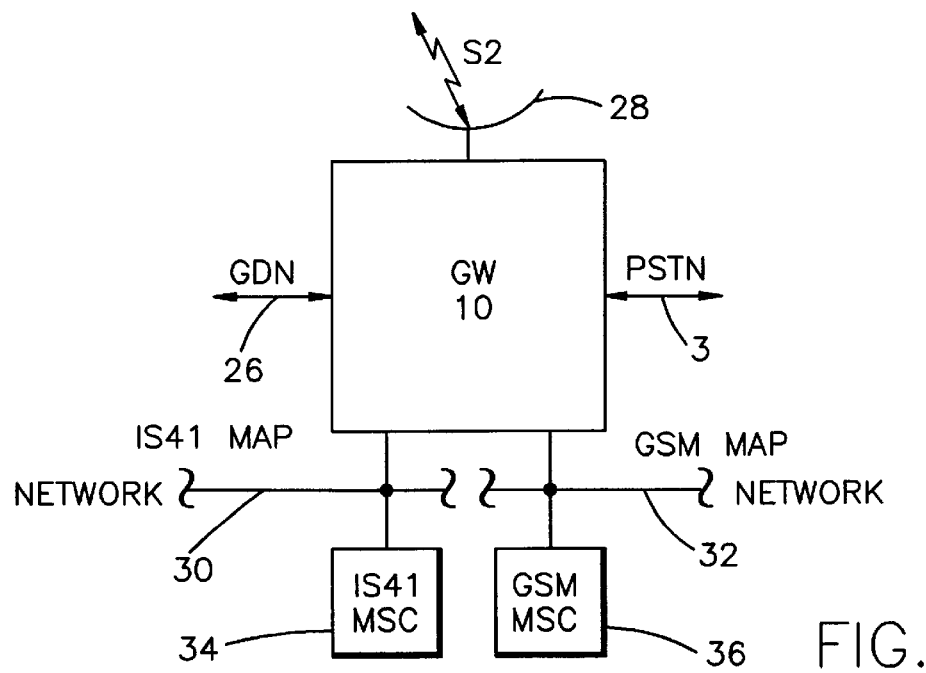
FIG. 5 is a simplified block diagram of a gateway shown in FIG. 1.

A simplified block diagram of the satellite gateway 10 is shown in FIG. 5. The gateway 10 is connected to the PSTN 3 and also to a terrestrial or ground data network (GDN) 26. The GDN 26 connects the gateway 10 to the terrestrial portion of the satellite communications system, such as other gateways, a Ground Operations Center (not shown), and a Satellite Operations Control Center (not shown). The gateway 10 includes at least one directional antenna 28 for transmitting and receiving the DS-CDMA satellite links S2 which connect the gateway 10 to the satellites 8 and thence to the UTs 7. The gateway 10 is also connected to Mobile Applications Part (MAP) networks. In the example shown there are two MAP networks. These are an IS-41 (AMPS) MAP network 30 and to a GSM MAP network 32. In turn the MAP networks are connected to Mobile Switching Centers (MSCs) of various Public Land Mobile Networks (PLMN). The IS-41 MAP network 30 is connected to an IS-41 MSC 34 and the GSM MAP network is connected to a GSM MSC 36.

Figure 6A:
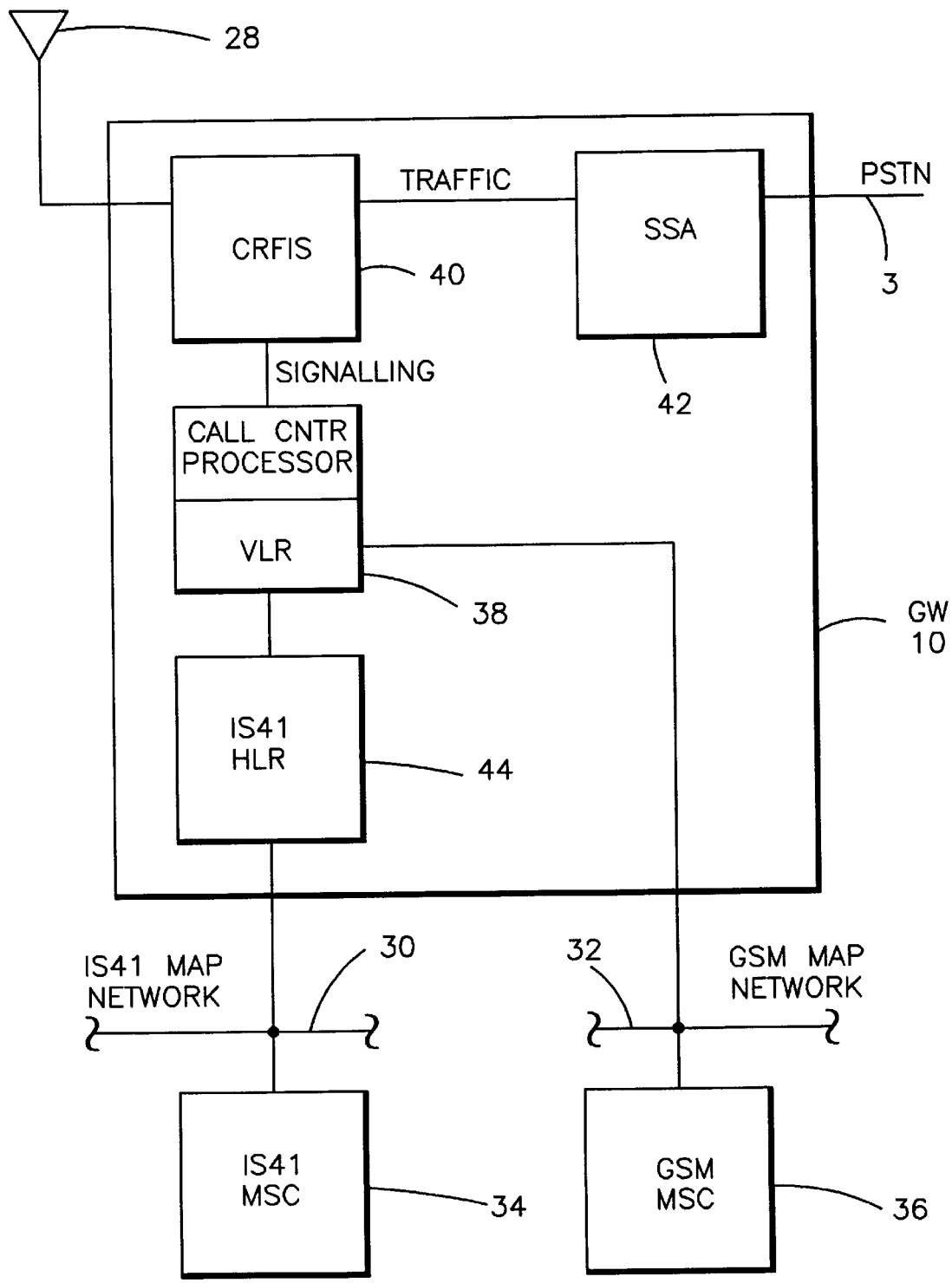
Figure 6B:
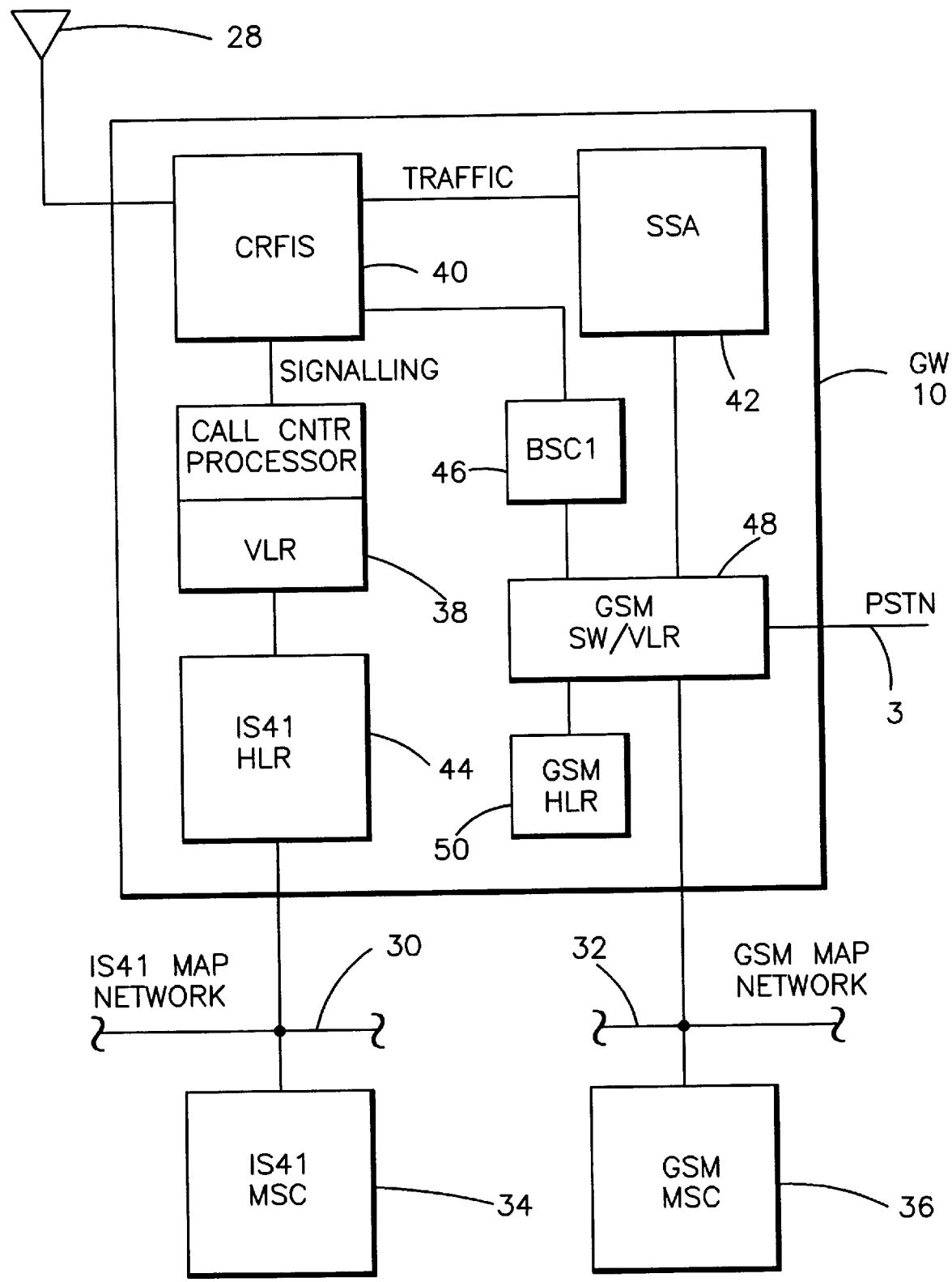

Referring now to FIGS. 6A and 6B, the gateway 10 is shown in more detail. In particular, FIG. 6A illustrates what is referred to herein as a 'Type 1' gateway 10, while FIG. 6B illustrates a 'Type 2' gateway 10. The Type 1 gateway 10 of FIG. 6A has a direct connection to the GSM MAP 32 from a call control processor/VLR 38 and thence to the GSM MSC 36. The Type 1 gateway 10 can provide most, but not all, GSM features. Also, in the Type 1 gateway 10 a connection from a Code Division Multiple Access (CDMA) RF Interface System (CRFIS) 40 to a Switch Assembly (SSA) 42 (e.g., an IS-41 MSC) is connected directly to the PSTN 3. The call control processor/VLR 38 is also connected to an IS-41 HLR 44, which in turn is connected to the IS-41 MAP network 30 and thence to the IS-41 MSC 34. The CRFIS 40 includes a packet switch/router.

The Type 2 gateway 10 of FIG. 6B uses a similar construction for the interface to the IS-41 MAP network 30, but modifies the gateway 10 so as to provide all GSM features. As is illustrated, the CRFIS 40 has an interface to a Base Station Controller Interface (BSCI) 46 for providing control signaling directly from the CRFIS 40 to a GSM SW/VLR 48, which in turn is also connected to a GSM HLR 50. The GSM SW/VLR 48 includes a GSM switch. In this case the GSM SW/VLR 48 communicates directly to the GSM-MAP network 32 and thence to one or more GSM MSCs 36. The call control processor/VLR 38 and IS-41 HLR function as before. Connection to the PSTN 3 is through the GSM SW 48.

A function of the circuitry shown in FIGS. 6A and 6B is to provide communications and signaling between MSCs 34 and 36 and the gateways 10 for switching the communications modes between the satellite and terrestrial systems, and to enable proper authentication, charging, and mobility management. These functions are generally referred to in the art as inter-working.

Figure 7B:
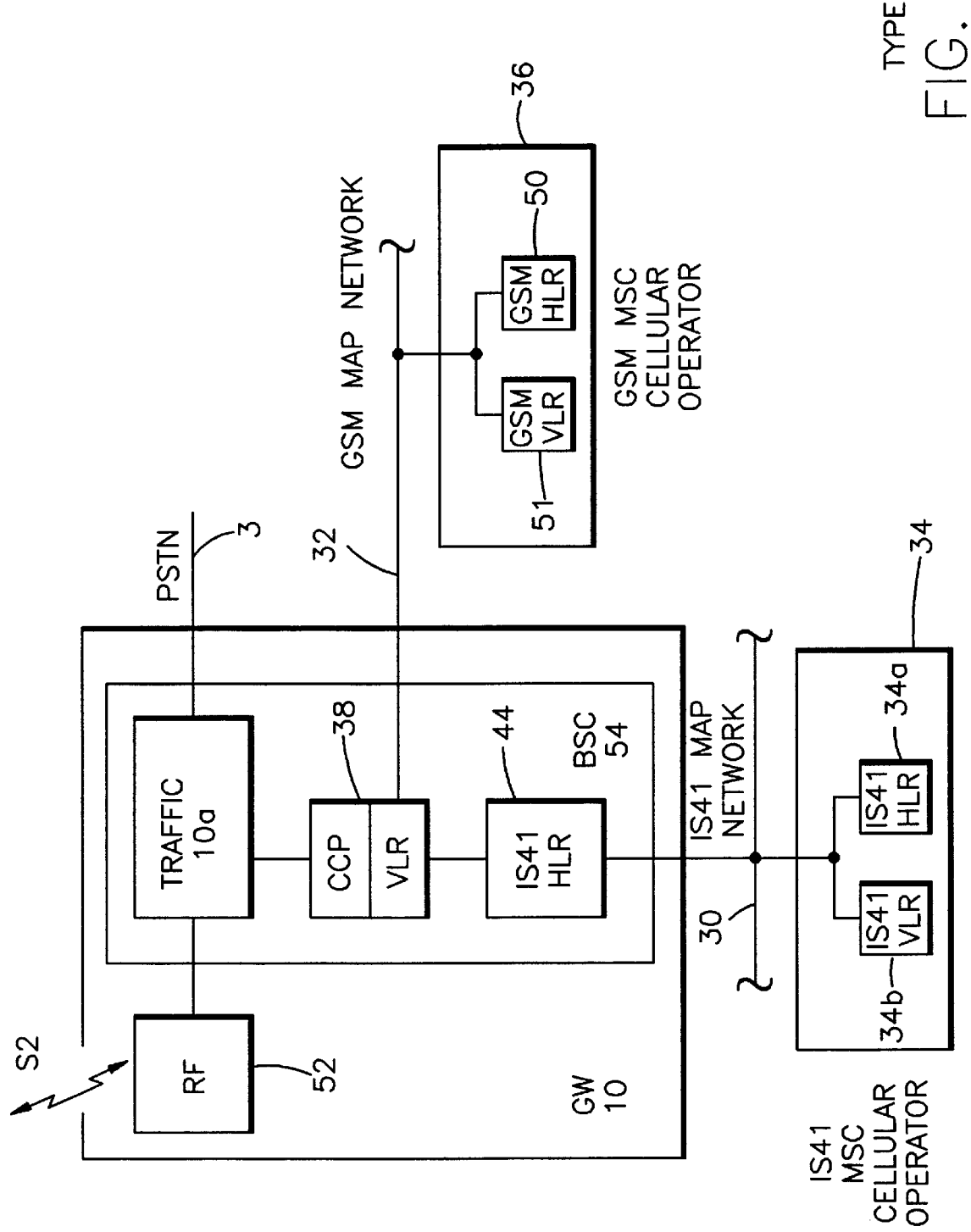

FIG. 7A is a more detailed block diagram of the Type 1 gateway 10 of FIG. 6A, while FIG. 7B simplifies the diagram of FIG. 7A for illustrating the UT 7 registration signalling paths.

Links S2 are maintained both to and from the satellites 8 through antennas 28 which may be fixed, or for a mobile satellite system using Low Earth Orbit satellites (LEOS), may use a number of steerable tracking antennas. These antennas are connected to suitable RF unit 52 comprising an RF transceiver. The output and input to the RF unit 52 is fed to a Base Station Controller (BSC) 54 which includes a traffic system 10a which connects user signals from the satellites 8 to the PSTN 3. The communications traffic to and from the UTs 7 flows via the CDMA RF Interface System (CRFIS) 40 to a Selector Bank System (SBS) 56, which functions as a packet router, and thence to the Switch Assembly (SSA) 42 and PSTN 3. Signaling flows from the CRFIS 40 to a billing system 58 via a Control Data Adapter (CDA) 60, to the GDN 26 via Base Station Manager 62, as well as to the CCP/VLR 38. The CCP includes the local VLR which is connected to the GSM MAP network 32 and thence to various GSM HLRs 50. The CCP/VLR 38 is also connected to the IS-41 HLR 44 and thence to the IS-41 MAP network 30 and to various IS-41 HLRs 34a.

The simplified diagram of FIG. 7B shows the signaling portion and the signaling routing from the CCP/VLR 38 out to either the IS-41 MAP network 30 or the GSM MAP network 32. Connections to various GSM-MSC cellular operators and various IS-41 MSC cellular operators are shown. The GSM MSC 36 contains both a GSM VLR 51 and a GSM HLR 50. The IS-41 network operator 34 includes an IS-41 VLR 34b and an IS-41 HLR 34a.

Figure 8B:
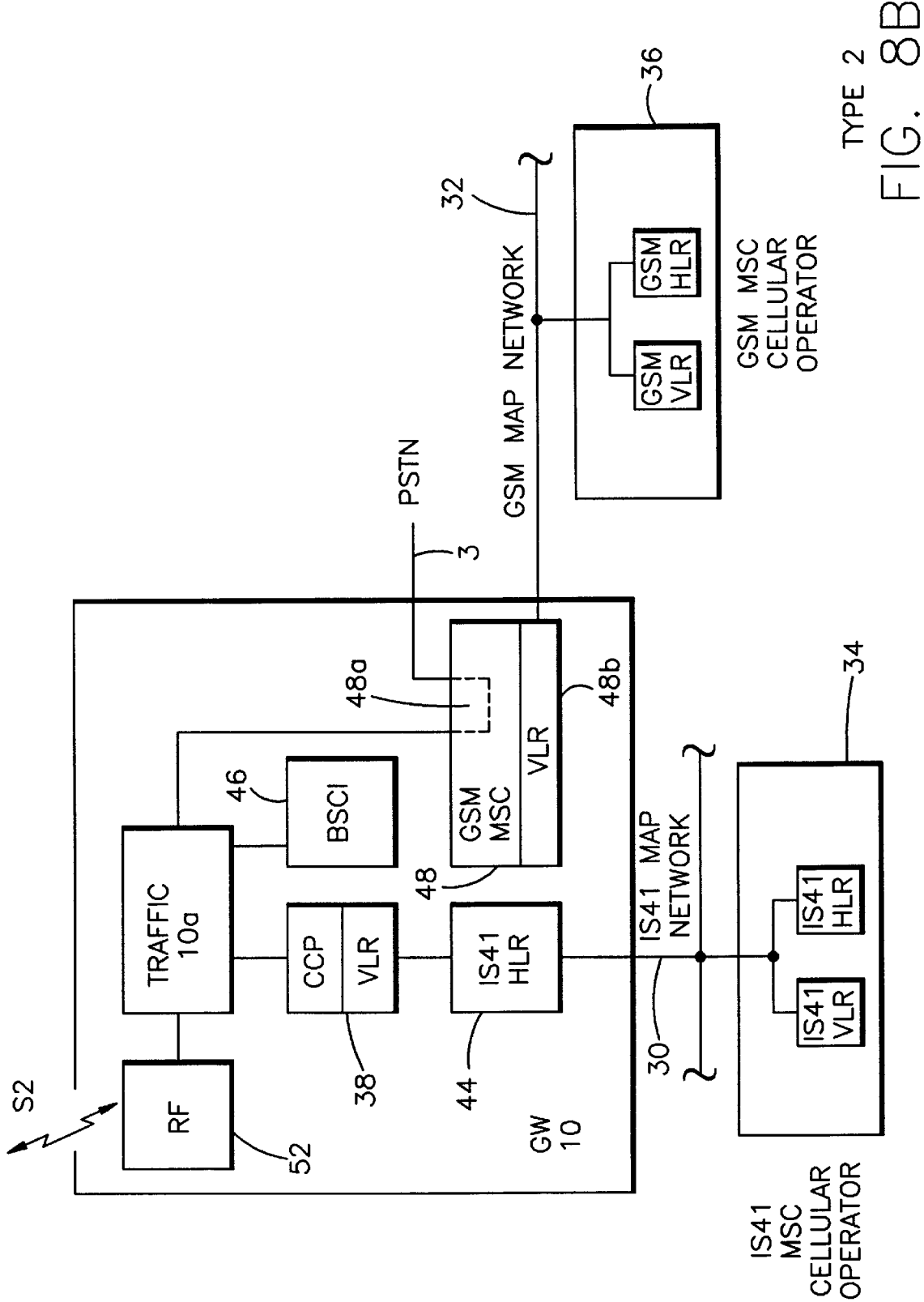

FIG. 8A is a more detailed block diagram of the Type 2 gateway 10 of FIG. 6B, while FIG. 8B simplifies the diagram of FIG. 8A for illustrating the UT 7 registration signalling paths.

The traffic connections are generally as described in the Type 1 gateway 10 of FIG. 7A, except that the input/output of the GSM switch 48a is connected to the GSM MSC 48 which is part of the gateway 10. The connection is via the GSM switch 48a and thence to the PSTN 3. Signaling flows from the CRFIS 40 to the CCP/VLR 38 and thence to the IS-41 HLR 44, as described above for IS-41 interconnection and inter-working. The signaling for GSM flows from the CRFIS 40 to the Base Station Controller Interface (BSCI) 46 and thence to the GSM MSC 48. Inter-working from the GSM/VLR 48b contained in the GSM MSC 48 is via the GSM MAP network 32.

Figure 9:
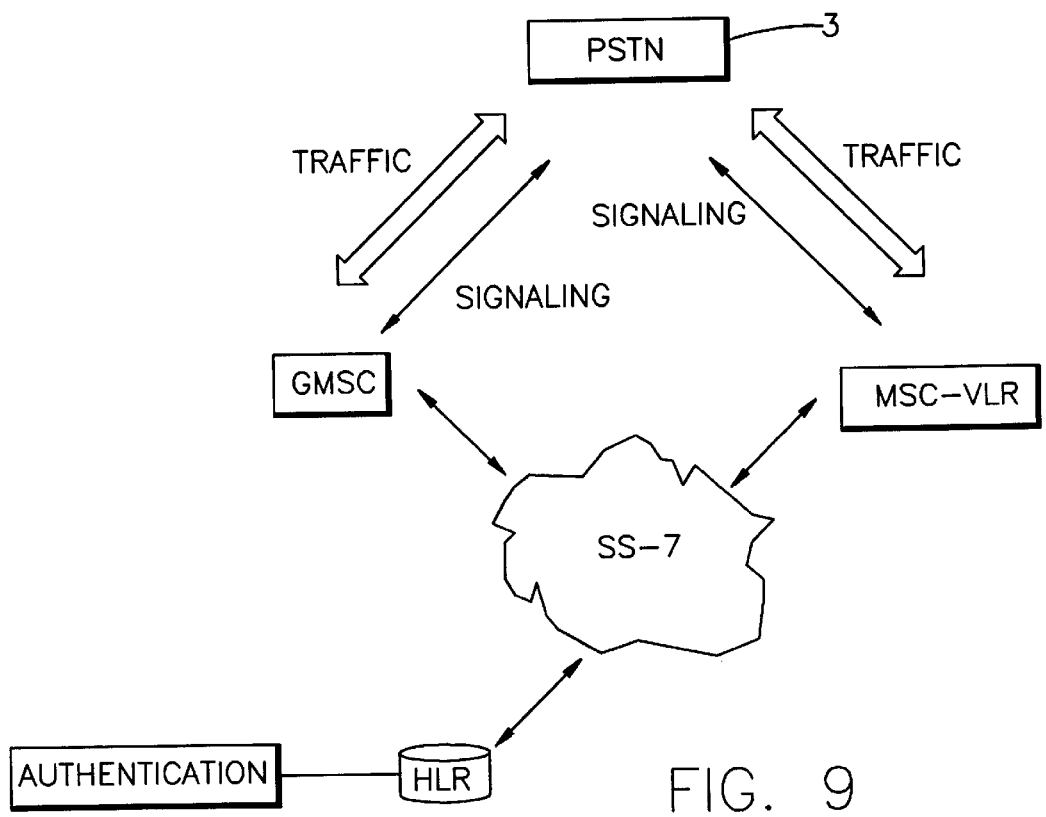
FIG. 9 is a diagram illustrating the flow of signalling and traffic information in the satellite/terrestrial communication system of this invention.

In general, and referring to FIG. 9, the Mobile Switching Center (MSC) coordinates setting up calls to/from GSM or IS-41 users, and provides interfaces to external networks. The interface facilitates connection to external networks to transport user data or signaling between GSM or IS-41 entities, using CCITT Signaling System No.7 (SS-7) protocols allowing cooperative inter-working between various network switching systems, either within one GSM or IS-41 network, or between many GSM or IS-41 networks.

It should be noted that it may be necessary to convert from one version of SS-7 to another. By example, it may be necessary to convert or translate from an ANSI version of SS-7 (used in the U.S.) to a version used by international signalling systems (e.g., ITU SS-7).

The Home Location Register (HLR) is a database of user information which is held in the communications system infrastructure independent of the user location. It includes the current location of the user (i.e. which network the user is in, not the physical latitude and longitude of the user). The HLR is typically a stand alone computer, and has subdivisions for handling authentication and security data for authenticating the user. The Visitor Location Register (VLR) is linked to one or more MSCs and temporarily stores data for users currently in the service area of the corresponding MSC(s). The user's current location is generally more precisely known to the VLR than to the HLR. A gateway switch (GMSC) is used to process calls and to handle incoming calls from the PSTN 3. These calls are routed to the GMSC without knowledge of the user location. The user location is fetched and the call is routed to the right MSC. In doing this the GMSC first finds the correct HLR knowing only the directory number of the GSM or IS-41 subscriber, then interrogates the HLR for the user information.

A thorough discussion of the various aspects of such inter-working, by example, can be found in a publication "The GSM System for Mobile Communications", Michel Mouly and Marie-Bernadette Paulet, Chapters 5, 6 and 7.

Previously the inter-working of systems involves signaling between various systems to set up and provide the user access to various networks based on the user's location. In general, the problem is one of insuring that the user access is authenticated before authorizing the user to access the network, and to set up the information to allow incoming calls to be routed to the user, and finally to ensure that billing is properly accounted for. In principle the inter-working process involves registration and de-registration according to various system rules which involves messages sent between the systems involved in the inter-working.

One problem that arises when implementing the automatic switching between satellite and terrestrial systems in accordance with an aspect of this invention relates to the large amount of signaling required in the registration process. For satellite systems which are generally power limited, this process can cause excessive use of power, thus limiting capacity. Furthermore, excessive use of the required RF and other circuitry in the UT 7 can reduce battery life.

One method to alleviate this problem is to simply only query the alternate system at infrequent intervals, (e.g., tens of minutes apart). However, this technique is less than optimum.

Figure 10:
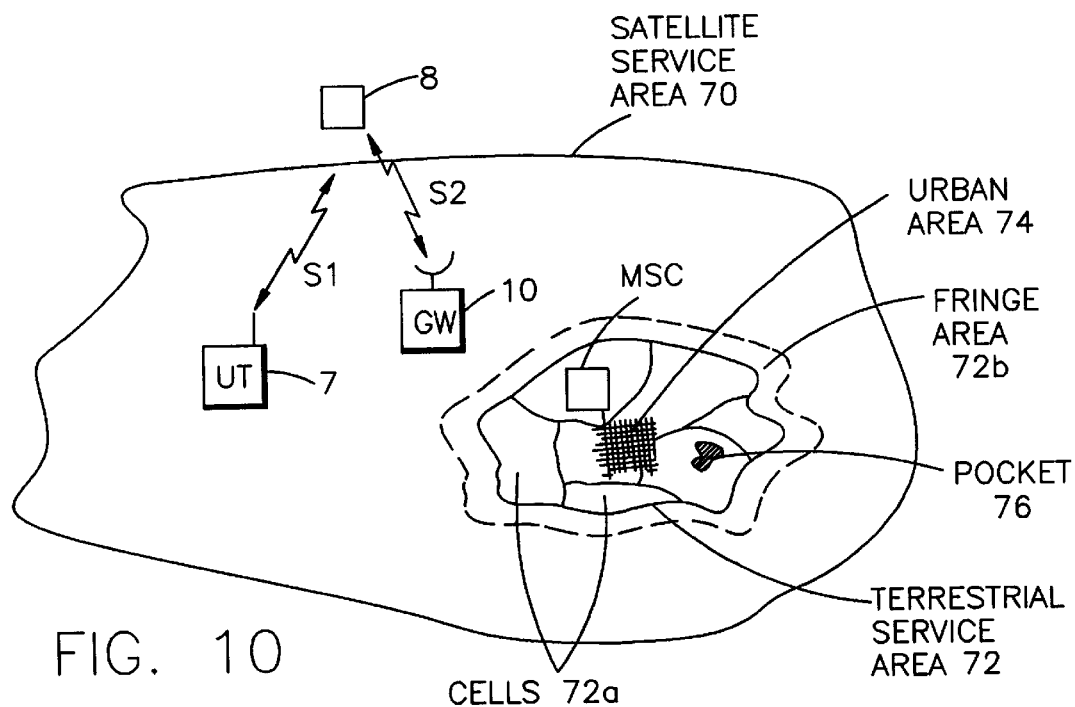
FIG. 10 is a diagram illustrating exemplary satellite and terrestrial service areas.

A better approach is now described in reference to FIG. 10. In FIG. 10 a satellite service area (SSA) 70 can generally be considered to be a boundary of a country. Within the SSA 70 is a terrestrial service area (TSA) 72. The TSA 72 is comprised of cells 72a, and has boundaries resulting from propagation effects of its constituent cells. The outer edges of the cell boundaries at the edge of the combined cell service area are referred to as fringe areas 72b. Also within the TSA 72 is, typically, at least one urban area 74 and pockets of poor service 76. The satellite MSC VLR (e.g., 48, 48b) can query the serving TSA MSC for the users "last" cell. Therefore, the user's general location can be known to within a few kilometers. Likewise, user position location measurements performed by the satellite system based on range and/or doppler measurements between the UT 7, satellite 8, and satellite system terrestrial gateways 10 enables the UT 7 position to be known. Therefore, both the terrestrial and satellite communications systems have knowledge of the location of the UT 7, but generally by differing means. Both systems also have an ability to query the user for his or her location.

There are now described several methods of inhibiting excessive registration and signal seeking of alternative systems.

Figure 17:
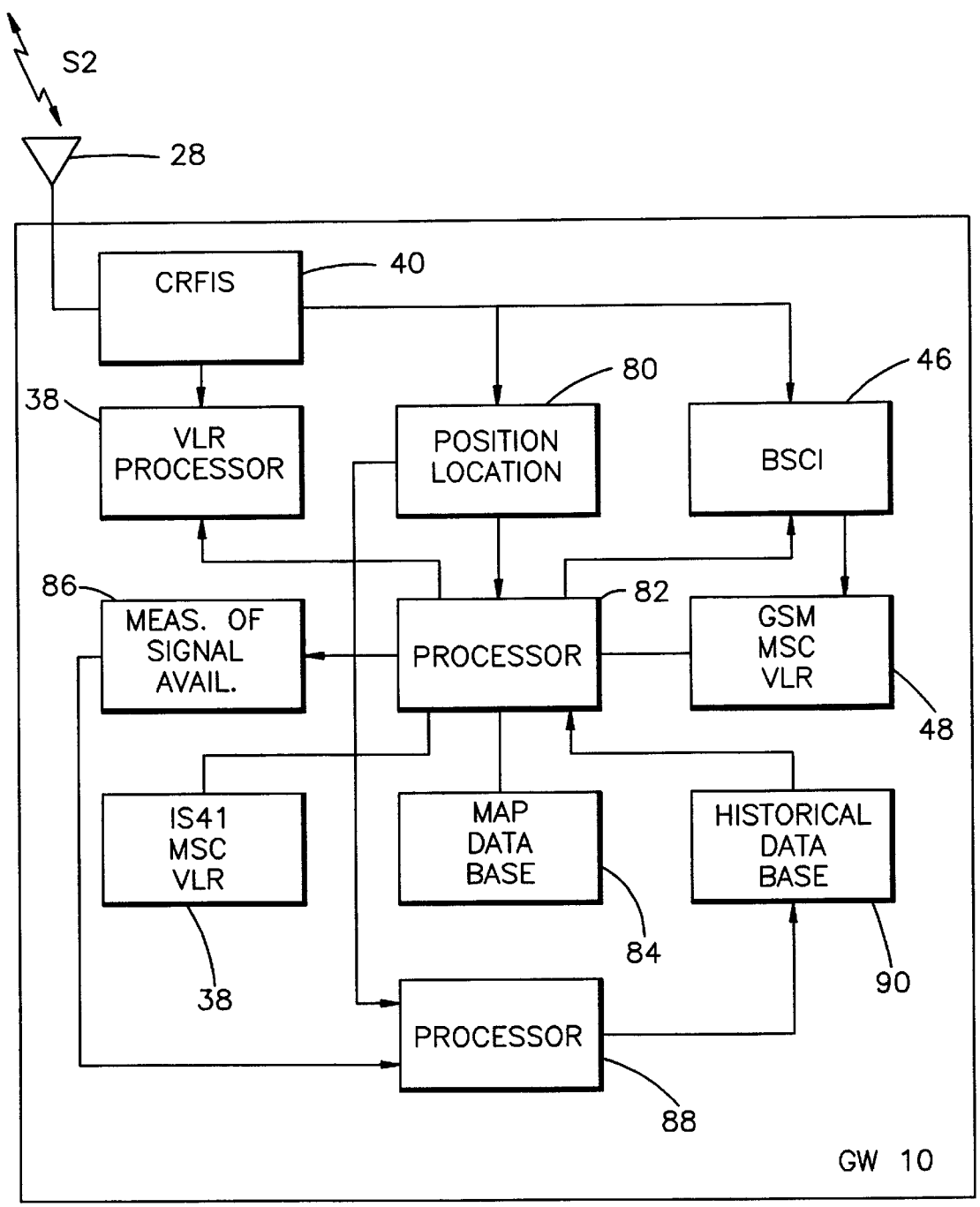
FIG. 17 is a simplified block diagram of a gateway that includes databases for storing service impairment maps and historical records of user terminal availabilities in accordance with an aspect of this invention.
Figure 18:
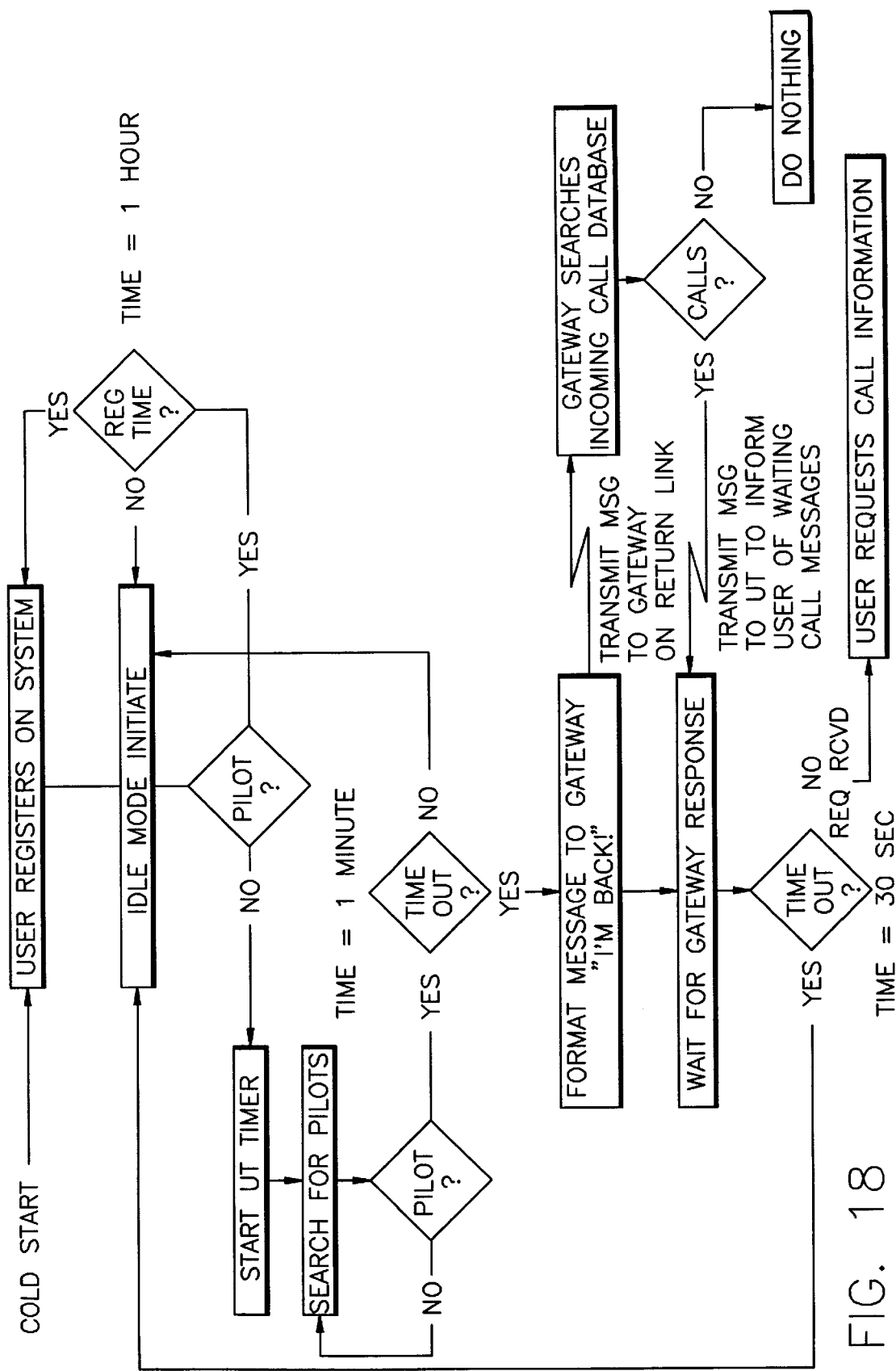
FIG. 18 is a logic flow diagram of a method in accordance with this invention managing the delivery of pages to the user terminal after the user terminal has temporarily lost synchronization with the gateway.

Referring to FIG. 17, there is illustrated a block diagram of a gateway 10 that is constructed to implement this method. In this embodiment a map is consulted to enable or inhibit the automatic registration/seek function until certain conditions are met. A position location function 80 is coupled to the CRFIS 40 and to a processor 82 which contains various algorithms and scripts. Also connected to the processor 82 are the GSM/MSC-VLR 48 and the IS 41 MSC-VLR 38. Further coupled to the processor 82 is a map database 84. The map database 84 contains a set of locations which are known to have poor connections for all users of either the terrestrial or satellite communications systems. By example, beyond the "fringe area" 72b of the TSA 72 it is known a priori that there is no terrestrial service. Continual searching for a terrestrial system by the UT 7 in this area thus is a waste of energy and computing time. Likewise, although there will be satellite coverage in the urban area 74, due to the many RF obstructions the quality may be poor. Continual searching for the satellite system in the urban area 74 may thus be generally ineffective. Furthermore, terrestrial cell 72a with pockets of poor coverage 76 are also well known to the terrestrial cellular operator.

Based on this and other information an accurate map can be stored in the database 84. Based on the information stored in the map database 84, and in accordance with the known location of the UT 7, the processor 82 can instruct the UT 7 to selectively inhibit or enable the automatic system searching function. A UT 7, by example, traveling in the satellite service area 70 would be instructed through a suitable signalling protocol to not seek a terrestrial system until the UT 7 is determined to be in or near the terrestrial service area 72. The UT 7 continuing into the TSA 72 may enter a cell 72a containing the pocket 76. Switching to the satellite when in the affected cell can thus insure the availability of communications. The user may further enter the urban area 74 where the satellite communication quality is generally poor. The boundaries of the urban area 74 can be determined and stored in the map database 84, or provided to the UT 7 by the gateway 10. Switching to the terrestrial cellular system when in the urban area 74 can thus ensure communications, without excessive automatic searching for the satellite system.

It is also within the scope of this invention to provide the UT 7 with a capability to store information that indicates the locations where the UT 7 has experienced poor satellite and/or terrestrial service with respect to the map (either contained at the gateway 10 or contained in the UT 7). The position of the UT 7, as self-determined or determined by the gateway 10, can thus be used to perform intelligent or adaptive switching based on a historical record of system connection quality and availability.

In this case the gateway 10 may measure the UT 7 availability with block 86 and also record the location of the UT 7 when the availability drops below a threshold value. By example, a separate processor 88 may be used for maintaining a historical data base 90 wherein the UT 7 availability and location information is stored. This enables the processor 82 to also use information derived from the historical database 90, and the current location of the UT 7, to determine a switching profile.

That is, the UT 7 will develop a 'history' as the UT 7 is repeatedly blocked or loses contact with one or the other of the satellite and terrestrial systems. In this case the availability of the UT 7 is measured by block 86, and is processed by the processor 88 by combining data from the UT position location unit 80 and the measurement unit 86. The results are stored in the historical database 90. As the UT 7 moves about the SSA 70 and TSA 72, the historical information is used in addition to the previously described methods to optimize the UT 7 system seek and registration modes.

Figure 12:
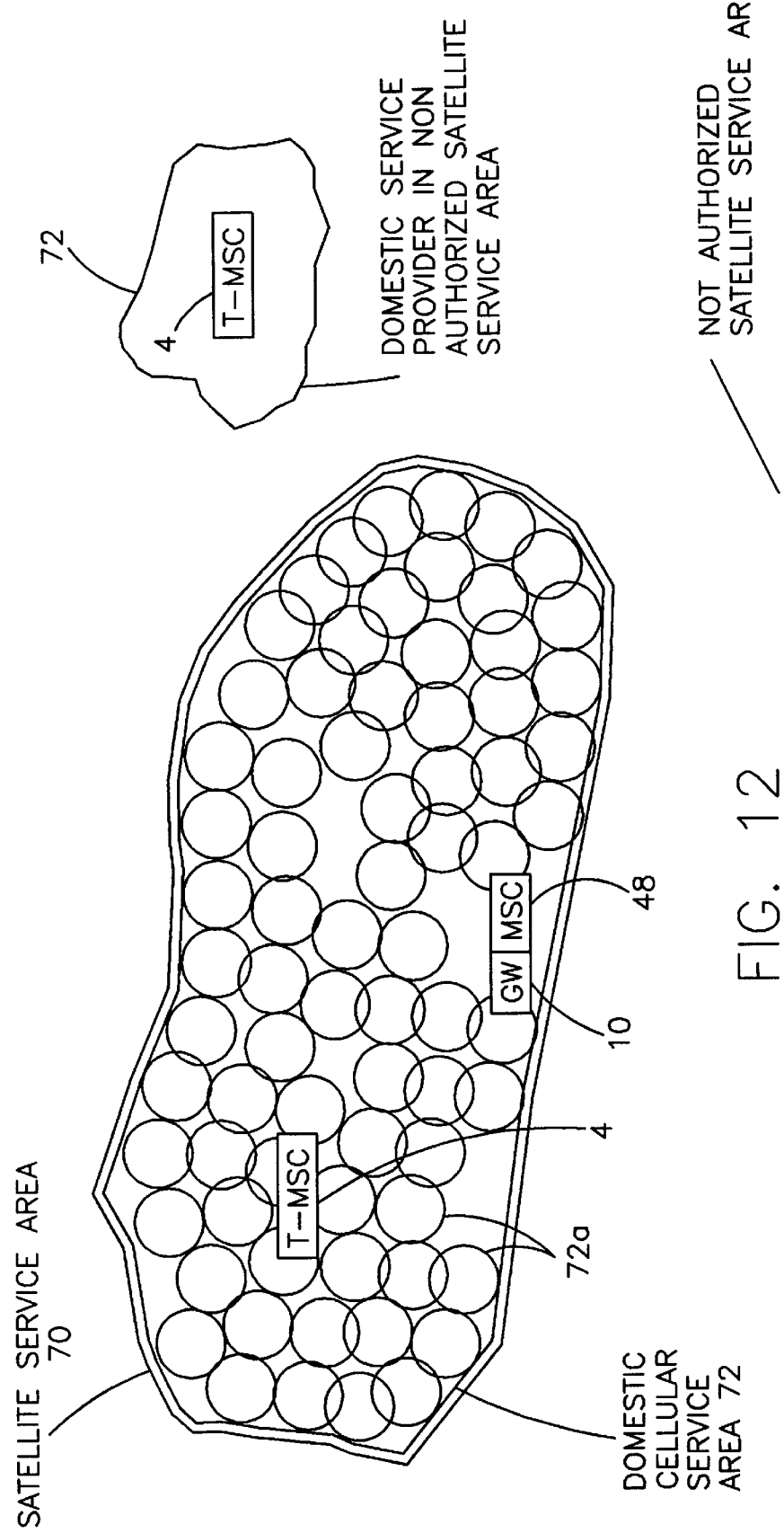
FIGS. 12–16 illustrate various exemplary relationships between satellite service areas and terrestrial domestic cellular service areas.
Figure 13:
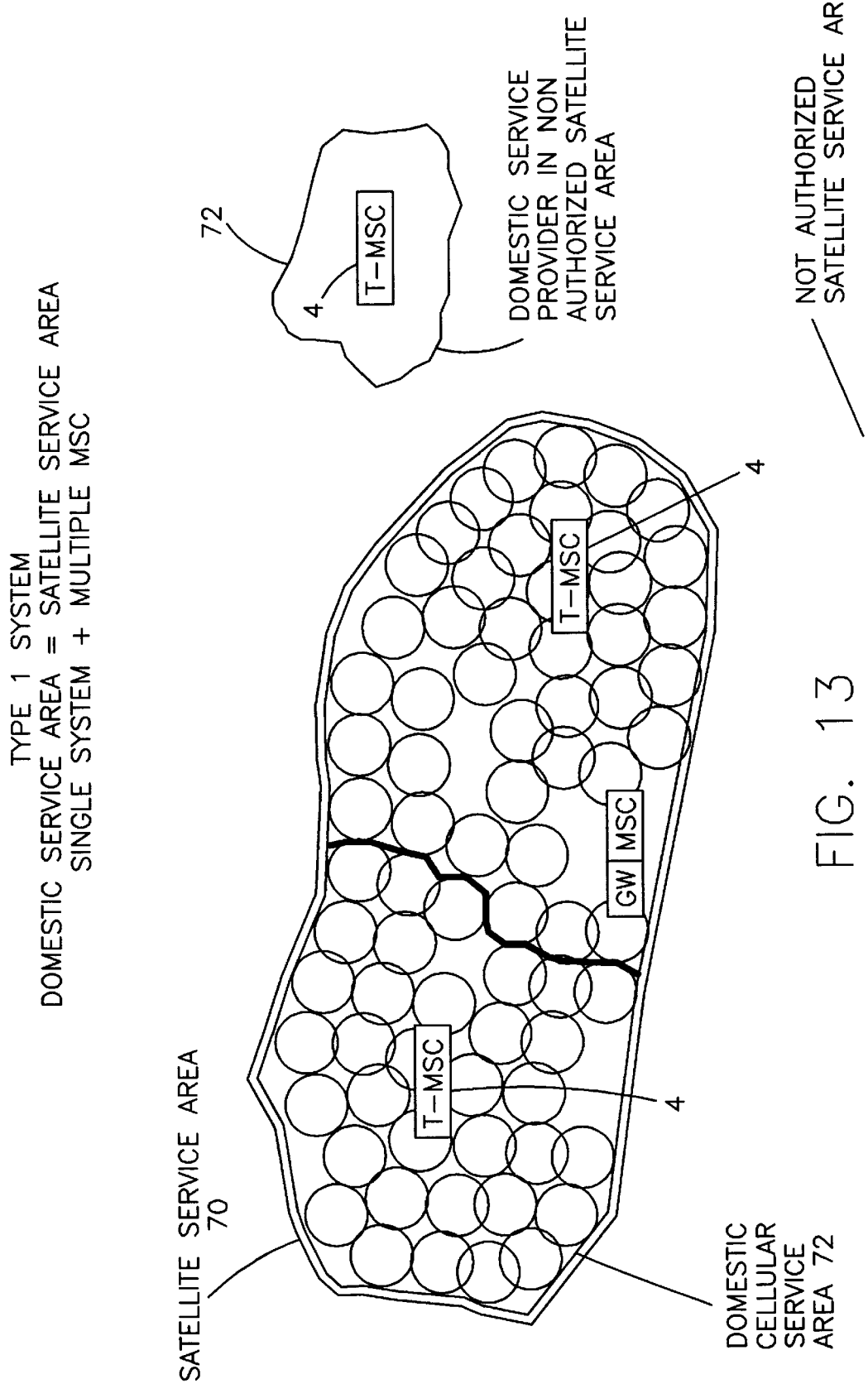
Figure 14:
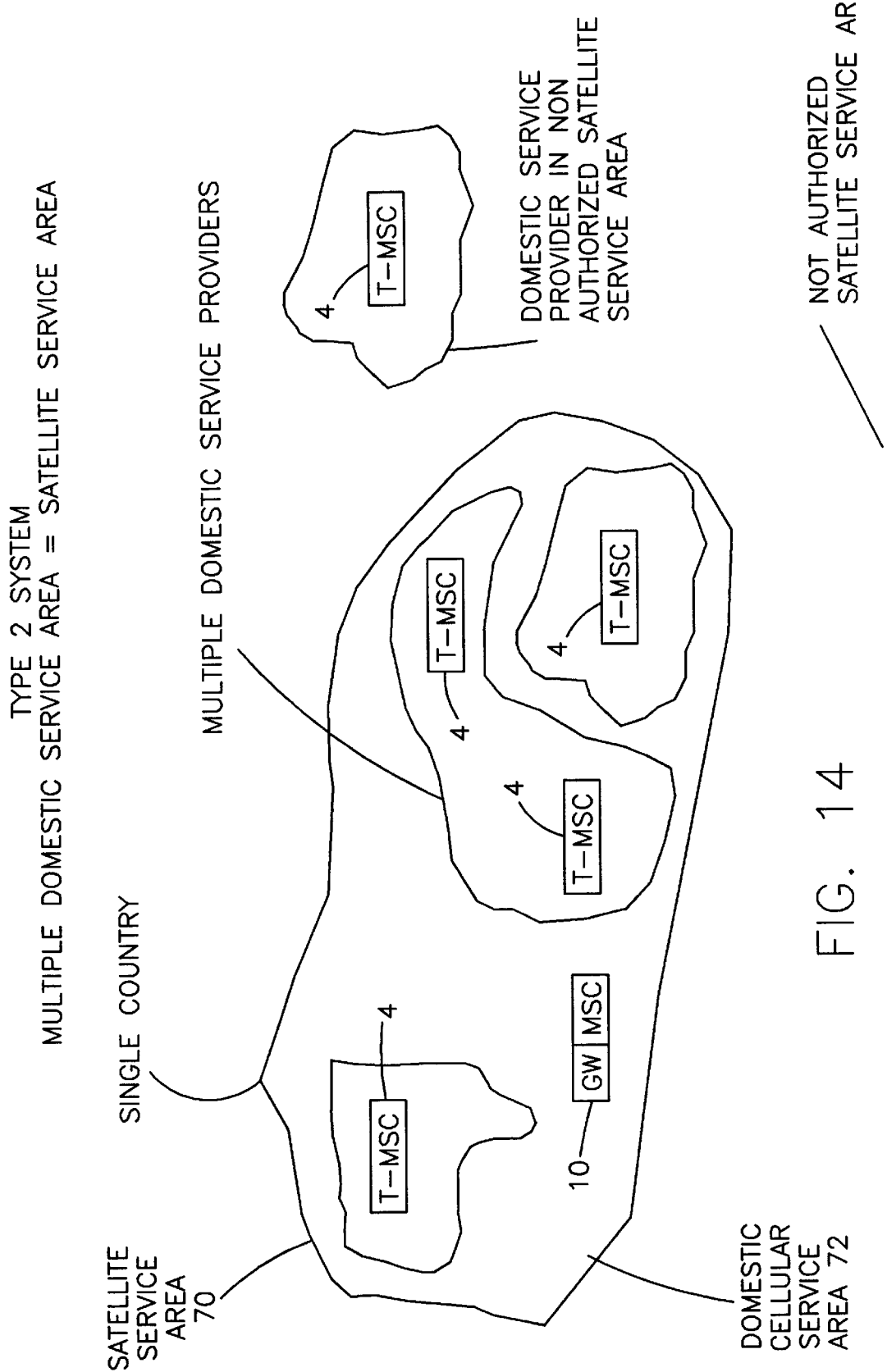
Figure 15:
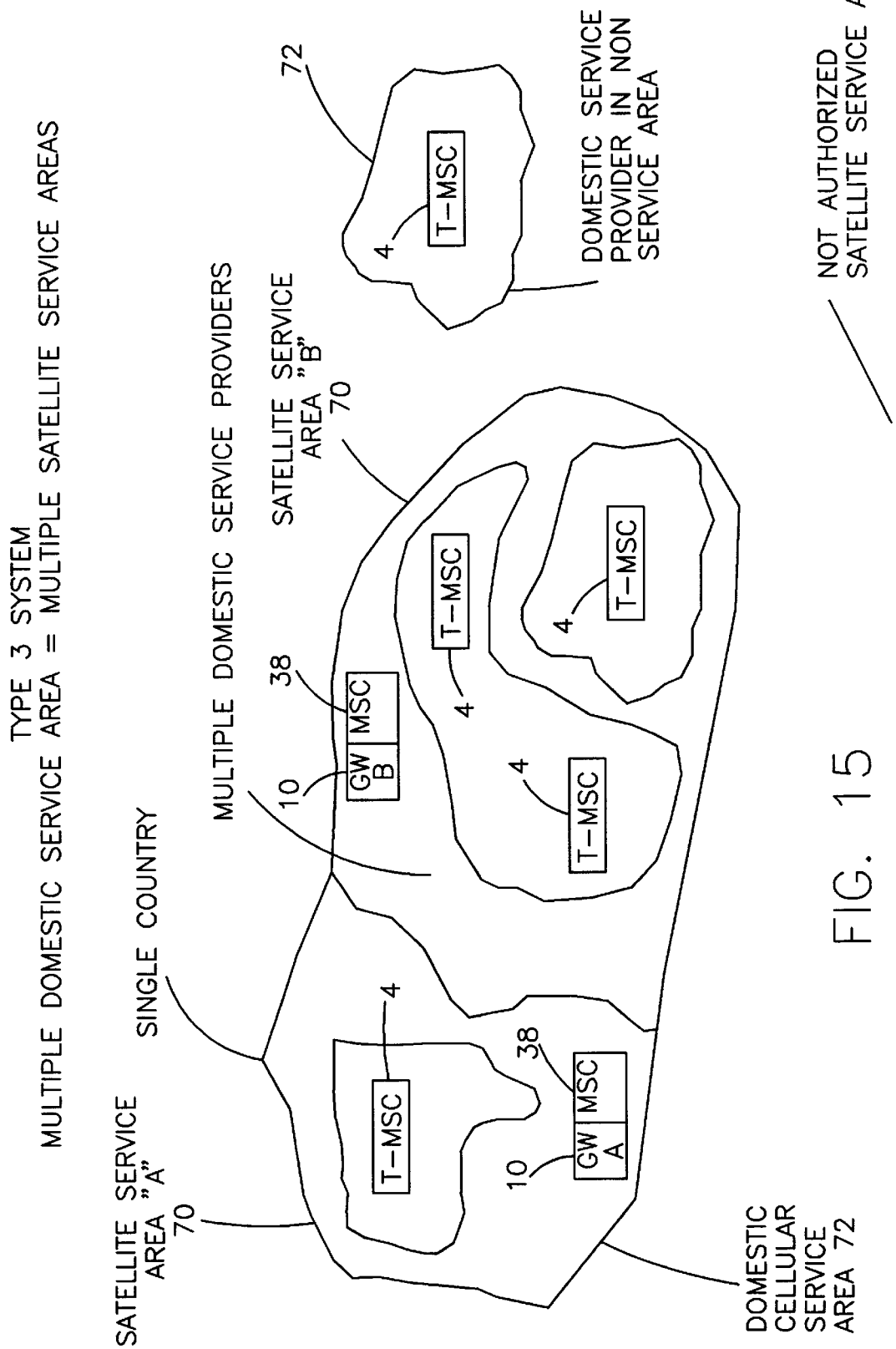
Figure 16:
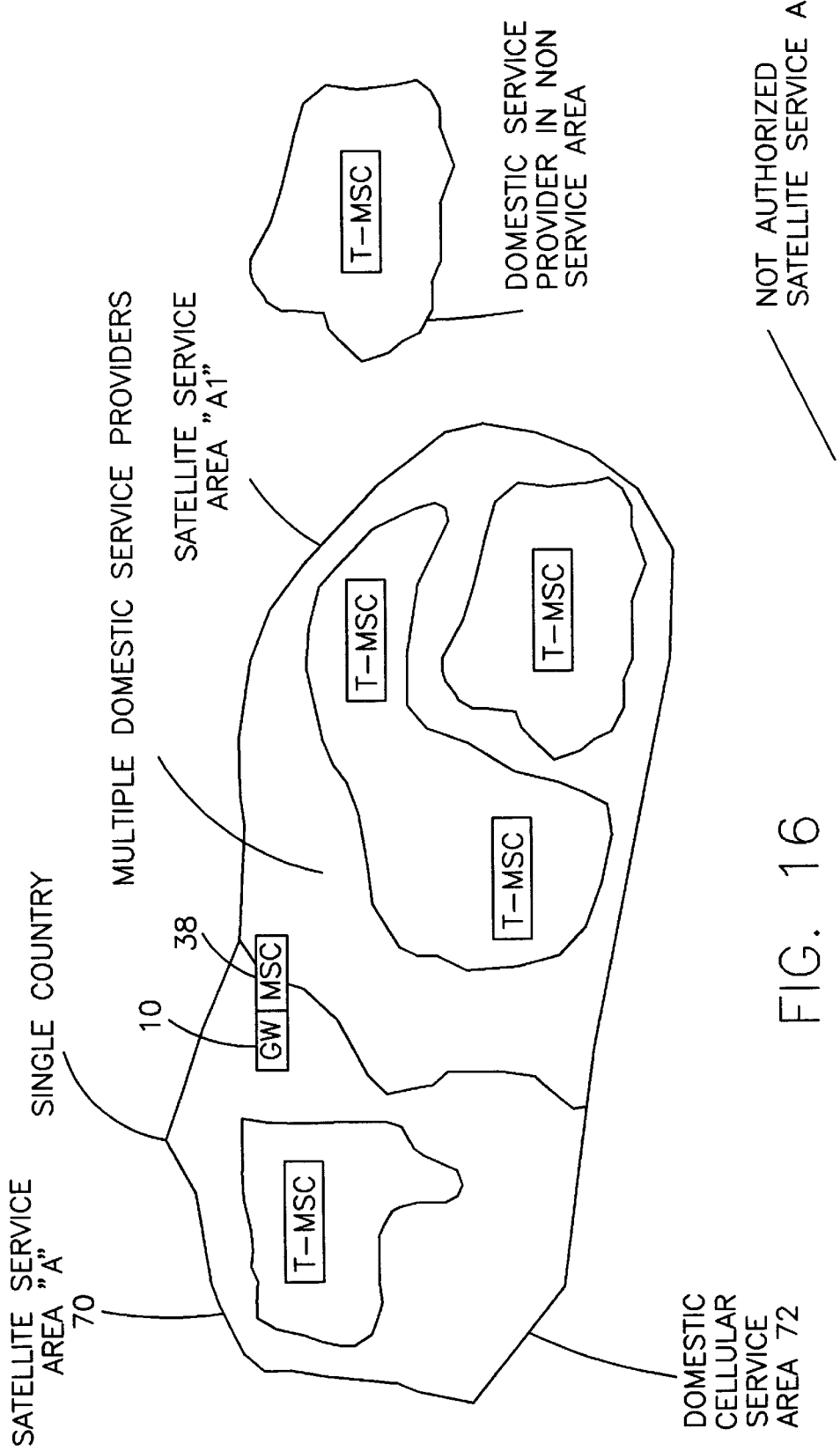

FIGS. 12–16 illustrate various system types having different relationships between a satellite service area 70 and a terrestrial service area 72. In FIG. 12 a domestic terrestrial service area 72, having a plurality of constituent cells 72a, is approximately congruent to the satellite service area 70. Each service area type has a single mobile switching center, one being the terrestrial MSC 4 and the other being the MSC 48 associated with the gateway 10. FIG. 12 also illustrates a domestic service provider coverage area that is located in a non-authorized satellite service area. FIG. 13 is similar to FIG. 12 except that there are multiple terrestrial MSCs 4 located within the satellite service area 70. FIG. 14 illustrates the case where the satellite service area 70, such as that contained within a single country, includes a plurality of domestic service providers and thus includes a plurality of terrestrial MSCs 4. Different service providers may use different air interfaces and related signalling protocols (e.g., IS-41 and IS-95). FIG. 15 illustrates a case, similar to FIG. 14, but wherein there are a plurality of satellite service areas designated A and B. In this case it is noted that each satellite service area includes an associated gateway 10 and gateway MSC 38. FIG. 16 illustrates a further embodiment where there are multiple satellite service areas that are served by a single shared gateway 10 and gateway MSC 38. The teaching of this invention applies equally to all of these various types of system configurations.

It was indicated above that the presently preferred communication technique in the satellite communication system component is the DS-CDMA technique. Typical of many CDMA techniques, such as those based on IS-95, is the use of a pilot channel. The pilot channel is an unmodulated, direct-sequence spread spectrum signal that is transmitted continuously by each gateway 10. The pilot channel allows the UT 7 to acquire the timing of the forward CDMA channel, provides a phase reference for coherent demodulation, and can also provide a means for making signal strength comparisons between gateways.

Assume now that the UT 7 is in communication with the gateway 10 and is capable of originating and receiving calls. The gateway 10 delivers pages to the UT 7 over a forward paging channel. By example, six to eight pages may be sent within 30 seconds. In response to a page the UT 7 will respond with appropriate signalling to the gateway 10. In this manner the gateway 10 knows that the UT 7 has received the page.

For the case where the UT 7 loses the pilot channel and thus loses synchronization with the gateway 10 the gateway 10 stores any non-acknowledged (non-delivered) pages. Subsequently, the UT 7 reacquires a pilot channel and indicates to the gateway 10 with suitable signalling that it is once again operational and has acquired a pilot channel. In response, the gateway 10 sends a message to the UT 7 that there are calls waiting in an incoming call database and requests that the UT 7 indicate whether the undelivered pages should be transmitted or whether they should remain stored until requested later. If there are no pages stored for the UT 7 the gateway 10 may either expressly indicate same or may indicate this indirectly by not sending a "pages waiting" message.

While the invention has been particularly shown and described with respect to preferred embodiments thereof, it will be understood by those skilled in the art that changes in form and details may be made therein without departing from the scope and spirit of the invention.

What is claimed is:

1. A communications system, comprising:

at least one user terminal;

a satellite communications component comprising at least one satellite and at least one terrestrial gateway;

a wireless terrestrial communications component comprising at least one repeater and at least one mobile switching center;

said at least one gateway and said at least one mobile switching center being coupled together by a first mobile applications part network, said at least one gateway and said at least one mobile switching center further being coupled to a terrestrial communications network; and said at least one user terminal comprising a first transceiver for bidirectionally communicating with said gateway through said satellite, a second transceiver for bidirectionally communicating with said mobile switching center through said repeater, and control means, responsive to a gateway selected system selection protocol, for enabling either said first transceiver or said second transceiver for conveying a user communication to said terrestrial communications network; wherein said communications system is further comprised of a data base storing data representing a map that indicates poor quality communications areas within a gateway service area, and wherein said gateway selected system selection protocol is modified as a function of said data from said data base;

wherein said gateway is bidirectionally coupled to said mobile applications part network through one of a home location register or a visitor location register; and wherein said gateway is bidirectionally coupled to a second mobile applications part network through one of a home location register or a visitor location register.

2. A communications system as set forth in claim 1, wherein said terrestrial communications network is comprised of a public switched telephone network.

3. A communications system as set forth in claim 1, wherein said system is further comprised of a data base storing data representing a historical record of user terminal availability within a gateway service area, and wherein said gateway selected system selection protocol is modified as a function of said data from said data base.

4. A communications system as set forth in claim 1, wherein said gateway is comprised of first interface means for coupling said gateway to said first mobile applications part network and a second interface means for coupling said gateway to said second mobile applications parts network.

5. A communications system, comprising:

at least one user terminal;

a satellite communications component comprising at least one satellite and at least one terrestrial gateway;

a wireless terrestrial communications component comprising at least one repeater and at least one mobile switching center;

said at least one gateway and said at least one mobile switching center being coupled together by a first mobile applications part network, said at least one gateway and said at least one mobile switching center further being coupled to a terrestrial communications network; and said at least one user terminal comprising a first transceiver for bidirectionally communicating with said gateway through said satellite, a second transceiver for bidirectionally communicating with said mobile switching center through said repeater, and control means, responsive to a gateway selected system selection protocol, for enabling either said first transceiver or said second transceiver for conveying a user communication to said terrestrial communications network; wherein said communications system is further comprised of a data base storing data representing a map that indicates poor quality communications areas within a gateway service area, and wherein said gateway selected system selection protocol is modified as a function of said data from said data base, wherein said gateway is comprised of first interface means for coupling said gateway to said first mobile applications part network and a second interface means for coupling said gateway to a second mobile applications parts network, and wherein said second interface means also couples said gateway to said terrestrial communications network.

6. A communications system as set forth in claim 1, wherein said gateway is further comprised of means for storing pages directed to said user terminal when said user terminal is not available to receive pages, and for subsequently delivering said stored pages to said user terminal when said user terminal is enabled to receive pages.

7. A method for operating a communications system, comprising steps of:

providing at least one user terminal, providing a satellite communications component that comprises at least one satellite and at least one terrestrial gateway, and providing a wireless terrestrial communications component that comprises at least one repeater and at least one mobile switching center, the at least one user terminal being provided so as to comprise a first transceiver for bidirectionally communicating with the terrestrial gateway through the at least one satellite and a second transceiver for bidirectionally communicating with the at least one mobile switching center through the at least one repeater;

coupling together the at least one gateway and the at least one mobile switching center with a first mobile applications part network;

further coupling the at least one gateway and the at least one mobile switching center to a terrestrial communications network; and operating a controller of the at least one user terminal to be responsive to a gateway selected system selection protocol for enabling either the first transceiver or the second transceiver for conveying a user communication to the terrestrial communications network; the method further comprising steps of, storing data in a data base accessible by the at least one gateway, the stored data representing a map indicating poor quality communications areas within a gateway service area; and modifying the gateway selected system selection protocol as a function of data stored in the data base.

8. A method as in claim 7, wherein the step of coupling includes a step of bidirectionally coupling the at least one gateway to the mobile applications part network through one of a home location register or a visitor location register.

9. A method as in claim 8, wherein the step of coupling includes a step of bidirectionally coupling the at least one gateway to a second mobile applications part network through one of a home location register or a visitor location register.

10. A method for operating a communications system, comprising steps of:

providing at least one user terminal, providing a satellite communications component that comprises at least one satellite and at least one terrestrial gateway, and providing a wireless terrestrial communications component that comprises at least one repeater and at least one mobile switching center, the at least one user terminal being provided so as to comprise a first transceiver for bidirectionally communicating with the terrestrial gateway through the at least one satellite and a second transceiver for bidirectionally communicating with the at least one mobile switching center through the at least one repeater;

coupling together the at least one gateway and the at least one mobile switching center with a first mobile applications part network;

further coupling the at least one gateway and the at least one mobile switching center to a terrestrial communications network; and operating a controller of the at least one user terminal to be responsive to one a gateway selected system selection protocol for enabling either the first transceiver or the second transceiver for conveying a user communication to the terrestrial communications network, and further comprising steps of:

storing data in a data base accessible by the at least one gateway, the stored data representing a historical record of user terminal availability within a gateway service area; and modifying the gateway selected system selection protocol as a function of data stored in the data base.

11. A method as set forth in claim 7, and further comprising steps of:

storing pages in the at least one gateway, the stored pages being those directed to the user terminal when the user terminal is not available to receive pages; and subsequently delivering the stored pages to the user terminal when the user terminal is enabled to receive pages.

12. A method as set forth in claim 10, and further comprising steps of:

storing pages in the at least one gateway, the stored pages being those directed to the user terminal when the user terminal is not available to receive pages; and subsequently delivering the stored pages to the user terminal when the user terminal is enabled to receive pages.

13. A method as set forth in claim 7, and further comprising a step of operating the controller of the at least one user terminal to be responsive instead to a user selected system selection protocol for enabling either the first transceiver or the second transceiver for conveying a user communication to the terrestrial communications network.

14. A method as set forth in claim 10, and further comprising a step of operating the controller of the at least one user terminal to be responsive instead to a user selected system selection protocol for enabling either the first transceiver or the second transceiver for conveying a user communication to the terrestrial communications network.

* * * * *